(12) United States Patent
Doyle et al.

(10) Patent No.: US 11,131,653 B2
(45) Date of Patent: Sep. 28, 2021

(54) DETERMINING THE MICROSTRUCTURE AND PROPERTIES OF MATERIALS USING ACOUSTIC SIGNAL PROCESSING

(71) Applicant: Utah Valley University, Orem, UT (US)

(72) Inventors: Timothy E. Doyle, Orem, UT (US);
Huda A. Al-Ghaib, Vineyard, UT (US);
Garrett M. Wagner, Lehi, UT (US)

(73) Assignee: Utah Valley University, Orem, UT (US)

( * ) Notice: Subject to any disclaimer, the term of this patent is extended or adjusted under 35 U.S.C. 154(b) by 333 days.

(21) Appl. No.: 16/122,691

(22) Filed: Sep. 5, 2018

(65) Prior Publication Data

US 2019/0072528 A1    Mar. 7, 2019

Related U.S. Application Data

(60) Provisional application No. 62/606,000, filed on Sep. 5, 2017, provisional application No. 62/606,001, filed (Continued)

(51) Int. Cl.
*G01N 29/46* (2006.01)
*G01N 29/34* (2006.01)

(Continued)

(52) U.S. Cl.
CPC ........... *G01N 29/46* (2013.01); *G01N 29/036* (2013.01); *G01N 29/12* (2013.01); *G01N 29/348* (2013.01);

(Continued)

(58) Field of Classification Search
CPC ...... G01N 29/07; G01N 29/036; G01N 29/46; G01N 2291/015; G01N 2291/024; G01N 29/12; G01N 29/348; G01N 29/38
See application file for complete search history.

(56) References Cited

U.S. PATENT DOCUMENTS 4,730,494 A    3/1988 Ishikawa et al.
6,501,848 B1 *    12/2002 Carroll ................. G06T 11/006
                                                    382/128

(Continued)

OTHER PUBLICATIONS

PCT/US18/49617, "Notification of Transmittal of the International Search Report and the Written Opinion of the International Searching Authority", International Searching Authority, dated Nov. 2, 2018, pp. 1-8.

(Continued)

*Primary Examiner* — Elias Desta
(74) *Attorney, Agent, or Firm* — Kunzler Bean & Adamson

(57) ABSTRACT

An apparatus, system, program product, and method are disclosed for determining the microstructure and properties of materials using acoustic signal processing. An apparatus includes a one or more sensors for sensing information describing a multiphase material using sound waves. The apparatus includes a processor operably coupled to the one or more sensors and a memory that stores code executable by the processor. The code is executable by the processor to receive sound-wave input from the one or more sensors, perform one or more quantitative analyses on the received sound-wave input in the frequency domain, and determine a microstructure of the multiphase material based on results from the one or more quantitative analyses.

20 Claims, 16 Drawing Sheets

Related U.S. Application Data on Sep. 5, 2017, provisional application No. 62/708,034, filed on Nov. 30, 2017, provisional application No. 62/708,037, filed on Nov. 30, 2017.

(51) Int. Cl.
*G01N 29/12* (2006.01)
*G01N 29/036* (2006.01)
*G01N 29/38* (2006.01)

(52) U.S. Cl.
CPC ....... *G01N 29/38* (2013.01); *G01N 2291/015* (2013.01)

(56) References Cited

U.S. PATENT DOCUMENTS

| | | | |
|---|---|---|---|
| 8,270,693 B2 * | 9/2012 | Zou | G06T 7/62 382/128 |
| 2013/0269441 A1 | 10/2013 | Doyle et al. | |
| 2018/0068039 A1 * | 3/2018 | Aboulhassan | G06T 15/005 |

OTHER PUBLICATIONS

Chandrapala, "Low intensity ultrasound applications on food systems", International Food Research Journal, Nov. 24, 2014, pp. 888-895, vol. 22, Issue 3.

\* cited by examiner

DETERMINING THE MICROSTRUCTURE AND PROPERTIES OF MATERIALS USING ACOUSTIC SIGNAL PROCESSING

CROSS-REFERENCES TO RELATED APPLICATIONS

This application claims the benefit of U.S. Provisional Patent Application No. 62/606,001 entitled ANALYSIS ALGORITHM FOR ACOUSTIC AND ELECTROMAGNETIC SIGNALS USING INFLECTION DENSITY AND INFLECTION POINT DISTRIBUTION and filed on Sep. 5, 2017, for TIMOTHY E. DOYLE, which is incorporated herein by reference. This application claims the benefit of U.S. Provisional Patent Application No. 62/606,000 entitled ANALYSIS ALGORITHM FOR ACOUSTIC AND ELECTROMAGNETIC SIGNALS USING WAVEFORM AND SPECTRAL TORTUOSITY and filed on Sep. 5, 2017, for TIMOTHY E. DOYLE, which is incorporated herein by reference. This application claims the benefit of U.S. Provisional Patent Application No. 62/708,037 entitled SIGNAL PROCESSING ALGORITHM FOR ACOUSTIC AND ELECTROMAGNETIC SPECTRA USING PEAK FREQUENCY DISTRIBUTION and filed on Nov. 30, 2017, for TIMOTHY E. DOYLE, which is incorporated herein by reference. This application claims the benefit of U.S. Provisional Patent Application No. 62/708,034 entitled SIGNAL PROCESSING ALGORITHM FOR ACOUSTIC AND ELECTROMAGNETIC PULSES USING ADAPTIVE SYMMETRIC AND ASYMMETRIC WINDOWING WITH DIFFERENT SLOPES and filed on Nov. 30, 2017, for TIMOTHY E. DOYLE, which is incorporated herein by reference.

FIELD

This invention relates to a method for determining the microstructure and properties of multiphase materials with the use of sound waves.

BACKGROUND

Determining the microscopic structure and properties of heterogeneous, multiphase materials with sound waves is a critical challenge for a wide range of industries and disciplines. Examples include solid rocket propellants, where both the microstructure and polymer matrix change with age and can degrade the propellant's mechanical properties; oil, gas, and water that can change the elastic wave properties of permeated rock strata and thus the ability to discover energy resources with seismic exploration methods; the detection of cancer within the human body, where tumorigenesis, tumor progression, and metastasis changes both the stiffness and microstructure of the affected tissue; the monitoring of fish schools in open water; and the quality control of powders, slurries, and suspensions in industrial processes.

Due to the complex interactions of wave propagation through multiphase materials, most current methods for analyzing the signals of sound waves propagating through these materials use an effective medium approach, empirical method, or single-scatterer approximation. These methods are not only inaccurate but are also usually limited to a few ultrasonic parameters that can only characterize the material at the macroscopic level, and cannot provide detailed information on the multiphase material's microstructure and micro-level properties. For example, effective medium approaches can provide information about the overall ultrasonic sound speed and attenuation properties of the material (e.g., the sound speed and attenuation of the examined human tissue), but very little about the microscopic heterogeneities in the material (e.g., cell-level changes in the tissue such as nuclear changes in cancer cells).

SUMMARY

An apparatus for determining the microstructure and properties of materials using acoustic signal processing is disclosed. A method and program product also perform the functions of the apparatus.

In one embodiment, an apparatus includes a one or more sensors for sensing information describing a multiphase material using sound waves. The apparatus, in a further embodiment, includes a processor operably coupled to the one or more sensors and a memory that stores code executable by the processor. In certain embodiments, the code is executable by the processor to receive sound-wave input from the one or more sensors, perform one or more quantitative analyses on the received sound-wave input in the frequency domain, and determine a microstructure of the multiphase material based on results from the one or more quantitative analyses.

A method, in one embodiment, includes receiving, by a processor, sound-wave input from one or more sensors. The one or more sensors may be configured to sense information describing a multiphase material using sound waves. The method, in further embodiments, includes performing one or more quantitative analyses on the received sound-wave input in the frequency domain. In some embodiments, the method includes determining a microstructure of the multiphase material based on results from the one or more quantitative analyses.

A program product, in one embodiment, includes a computer readable storage medium having program code embodied therein. The program code, in certain embodiments, is readable/executable by a processor for receiving sound-wave input from one or more sensors. The one or more sensors may be configured to sense information describing a multiphase material using sound waves. The program code, in some embodiments, is readable/executable by a processor for performing one or more quantitative analyses on the received sound-wave input in the frequency domain. The program code, in further embodiments, is readable/executable by a processor for determining a microstructure of the multiphase material based on results from the one or more quantitative analyses.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
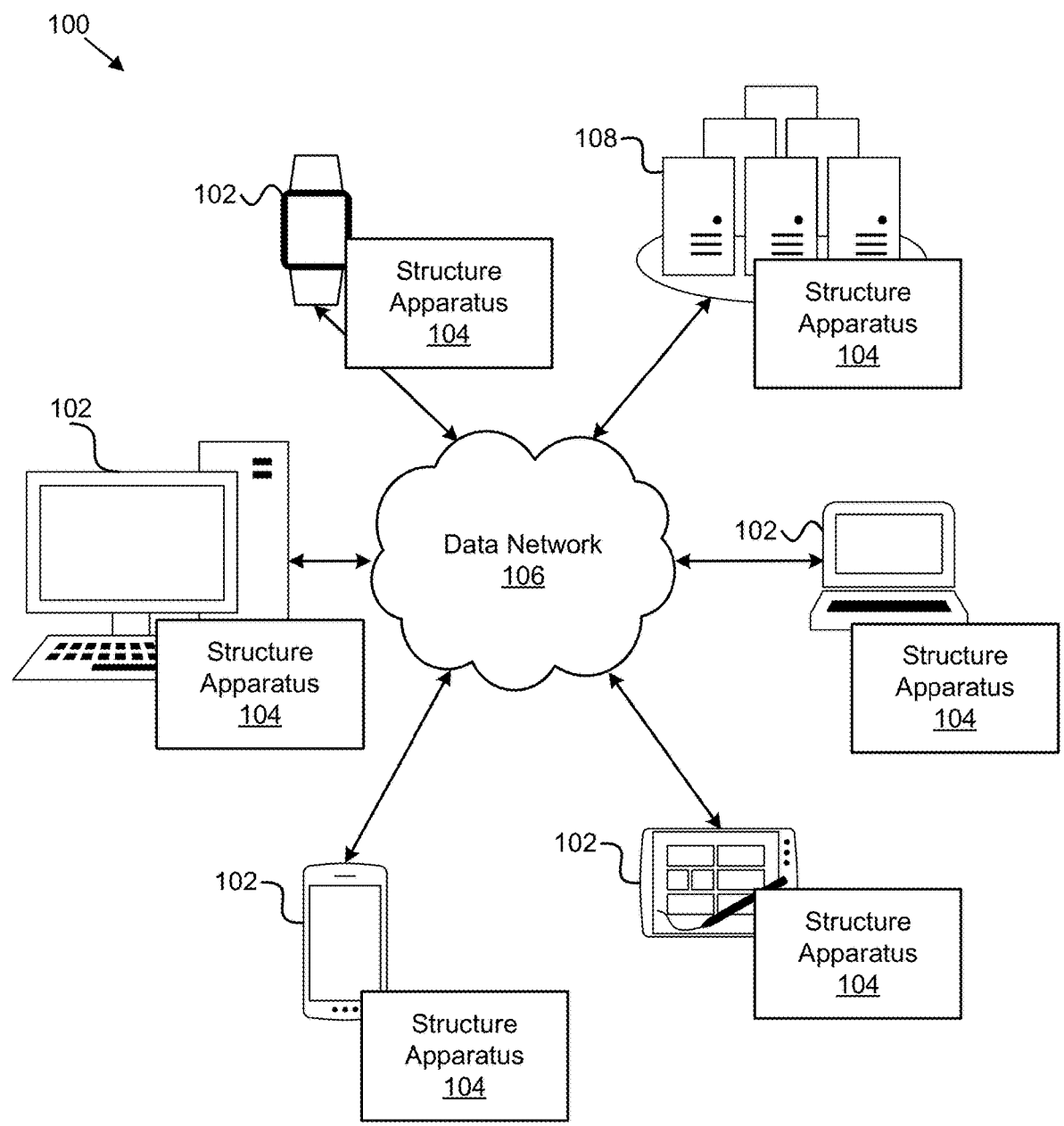
FIG. 1 is a schematic block diagram illustrating one embodiment of a system for determining the microstructure and properties of materials using acoustic signal processing.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The subject matter disclosed herein filters and analyzes time-domain waveforms arising from acoustic, ultrasonic, elastic, or the like wave pulses that have been received and converted to electrical signals by one or more sensors or transducers. The subject matter disclosed herein may comprise a collection of related signal processing modules for filtering noise and artifacts from the waveforms, and then analyzing the waveforms in the frequency domain to characterize the properties and structure of a physical medium, including but not limited to gas, liquid, solid, dispersion, gel, artificial material, or biological tissue. To characterize the physical medium, the subject matter disclosed herein relies on the physics-based principles of wave scattering from discrete inclusions (e.g., Mie scattering) that comprise the medium.

The subject matter disclosed herein aims to improve the acoustic, ultrasonic, or elastic wave characterization of multiphase materials by implementing a signal processing method that provides information on the microstructural detail of the material. In one embodiment, the signal is first filtered in the time domain with an adaptive window to suppress noise and artifacts while preserving as much of the original characteristics of the signal as possible. The signal may then be transformed into a spectrum in the frequency domain, where three different computations are performed to quantify the scattering events occurring between the waves and the scattering sites in the microscopic structure. These computations may include computing the inflection point density, the tortuosity, and the peak distribution within a specified spectral band (e.g., frequency range). The scattering events may be quantified to determine the size of the scattering sites, the number density of the scattering sites, and/or one or more other microstructural details of the material. Parameters calculated from the above computations may be used in either a univariate or multivariate analysis to fully and multi-dimensionally characterize the microscopic structure and properties of the material.

In one embodiment, an apparatus includes a one or more sensors for sensing information describing a multiphase material using sound waves. The apparatus, in a further embodiment, includes a processor operably coupled to the one or more sensors and a memory that stores code executable by the processor. In certain embodiments, the code is executable by the processor to receive sound-wave input from the one or more sensors, perform one or more quantitative analyses on the received sound-wave input in the frequency domain, and determine a microstructure of the multiphase material based on results from the one or more quantitative analyses.

In one embodiment, the one or more quantitative analyses comprises an inflection point density analysis for analyzing a shape of a frequency-domain spectrum that the sound-wave input generates. In certain embodiments, the code is further executable by the processor to perform the inflection point density analysis by performing a complex Fourier transform on the sound-wave input to generate a complex function, determining a magnitude of the complex function to obtain a power spectrum, calculating a second derivative of the power spectrum, identifying a frequency range of the power spectrum for determining the inflection point density, locating one or more inflection points of the power spectrum by determining where the second derivative goes to zero, and determining a total of the located one or more inflection points within the identified frequency range.

In certain embodiments, the one or more quantitative analyses comprises a tortuosity analysis for analyzing a shape of a frequency-domain spectrum that the sound-wave input generates. In one embodiment, the code is further executable by the processor to perform the tortuosity analysis by performing a complex Fourier transform on the sound-wave input to generate a complex function, determining a magnitude of the complex function to obtain a power spectrum, calculating a second derivative of the power spectrum, identifying a frequency range of the power spectrum for determining the tortuosity, determining frequency positions of one or more inflection points of the power spectrum by calculating where the second derivative goes to zero, calculating a length of each arc between the one or more inflection points and along the power spectrum within the identified frequency range, calculating a length of each chord between the one or more inflection points within the identified frequency range, and calculating a tortuosity of the power spectrum within the identified frequency range based on the calculated lengths of each arch and the calculated lengths of each chord.

In further embodiments, the one or more quantitative analyses comprises a peak distribution analysis for determining a distribution of peaks and valleys for a frequency-domain spectrum that the sound-wave input generates. In one embodiment, the code is further executable by the processor to perform the peak distribution analysis by performing a complex Fourier transform on the sound-wave input to generate a complex function, determining a magnitude of the complex function to obtain a power spectrum, calculating a first derivative of the power spectrum, identifying a frequency range of the power spectrum for determining the peak distribution, and determining frequency positions of one or more peaks and valleys of the power spectrum by calculating where the first derivative goes to zero.

In certain embodiments, the code is further executable by the processor to determine the microstructure of the multiphase material by correlating the results from the one or more quantitative analyses to previously determined peak distribution results from computational scattering models.

In some embodiments, the code is further executable by the processor to isolate a time-domain waveform of the sound-wave input by identifying a waveform amplitude start threshold for determining a start point of a window with respect to the waveform and a waveform amplitude end threshold for an end point of the window with respect to the waveform, determining the start point of the window as a function of the waveform amplitude start threshold, determining the end point of the window as a function of the waveform amplitude end threshold, and determining a length of the window from the start point to the end point, the window isolating the waveform in the time-domain. In some embodiments, the one or more quantitative analyses are performed on the waveform isolated in the time-domain window.

In one embodiment, the code is further executable by the processor to generate a visualization of the results of the one or more quantitative analyses, the visualization comprising one or more of a scatter plot and a heat map. In various embodiments, the multiphase material comprises at least one of biological tissues, engineering materials, and natural resources. In some embodiments, the apparatus includes a sound-wave generator operably coupled to the one or more sensors to transmit sound waves into the multiphase material.

A method, in one embodiment, includes receiving, by a processor, sound-wave input from one or more sensors. The one or more sensors may be configured to sense information describing a multiphase material using sound waves. The method, in further embodiments, includes performing one or more quantitative analyses on the received sound-wave input in the frequency domain. In some embodiments, the method includes determining a microstructure of the multiphase material based on results from the one or more quantitative analyses.

In one embodiment, the one or more quantitative analyses comprises an inflection point density analysis for analyzing a shape of a frequency-domain spectrum that the sound-wave input generates. In certain embodiments, the method includes performing the inflection point density analysis by performing a complex Fourier transform on the sound-wave input to generate a complex function, determining a magnitude of the complex function to obtain a power spectrum, calculating a second derivative of the power spectrum, identifying a frequency range of the power spectrum for determining the inflection point density, locating one or more inflection points of the power spectrum by determining where the second derivative goes to zero, and determining a total of the located one or more inflection points within the identified frequency range.

In certain embodiments, the one or more quantitative analyses comprises a tortuosity analysis for analyzing a shape of a frequency-domain spectrum that the sound-wave input generates. In one embodiment, the method includes performing the tortuosity analysis by performing a complex Fourier transform on the sound-wave input to generate a complex function, determining a magnitude of the complex function to obtain a power spectrum, calculating a second derivative of the power spectrum, identifying a frequency range of the power spectrum for determining the tortuosity, determining frequency positions of one or more inflection points of the power spectrum by calculating where the second derivative goes to zero, calculating a length of each arc between the one or more inflection points and along the power spectrum within the identified frequency range, calculating a length of each chord between the one or more inflection points within the identified frequency range, and calculating a tortuosity of the power spectrum within the identified frequency range based on the calculated lengths of each arch and the calculated lengths of each chord.

In further embodiments, the one or more quantitative analyses comprises a peak distribution analysis for determining a distribution of peaks and valleys for a frequency-domain spectrum that the sound-wave input generates. In one embodiment, the method includes performing the peak distribution analysis by performing a complex Fourier transform on the sound-wave input to generate a complex function, determining a magnitude of the complex function to obtain a power spectrum, calculating a first derivative of the power spectrum, identifying a frequency range of the power spectrum for determining the peak distribution, and determining frequency positions of one or more peaks and valleys of the power spectrum by calculating where the first derivative goes to zero.

A program product, in one embodiment, includes a computer readable storage medium having program code embodied therein. The program code, in certain embodiments, is readable/executable by a processor for receiving sound-wave input from one or more sensors. The one or more sensors may be configured to sense information describing a multiphase material using sound waves. The program code, in some embodiments, is readable/executable by a processor for performing one or more quantitative analyses on the received sound-wave input in the frequency domain. The program code, in further embodiments, is readable/executable by a processor for determining a microstructure of the multiphase material based on results from the one or more quantitative analyses.

FIG. 1 depicts a schematic block diagram illustrating one embodiment of a system 100 for determining the microscopic structure and properties of materials using acoustic signal processing. In one embodiment, the system 100 includes one or more information handling devices 102, one or more structure apparatuses 104, one or more data networks 106, and one or more servers 108. In certain embodiments, even though a specific number of information handling devices 102, structure apparatuses 104, data networks 106, and servers 108 are depicted in FIG. 1, one of skill in the art will recognize, in light of this disclosure, that any number of information handling devices 102, structure apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, a signal (e.g., sound wave) generating device, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in further embodiments, are configured to execute various programs, program code, applications, instructions, functions, and/or the like, which may access, store, download, upload, and/or the like data located on one or more servers 108. The information handling devices 102 may include one or more sensors for detecting sound waves such as acoustic waves, ultrasonic waves, elastic waves, and/or the like. The information handling devices 102

In one embodiment, the structure apparatus 104 is configured to determine a microstructure of a multiphase material by performing quantitative analyses on sound-wave data that is sensed from the multiphase material using sound-wave sensors. In certain embodiments, the structure apparatus 104 is configured to receive sound-wave input from one or more sensors that are configured to sense information describing a multiphase material using sound waves, perform one or more quantitative analyses on the received sound-wave input in the frequency domain, and determine a microstructure of the multiphase material based on results from the one or more quantitative analyses. The structure apparatus 104, including its various sub-modules, may be located on one or more information handling devices 102 in the system 100, one or more servers 108, one or more network devices, one or more security systems, and/or the like. The structure apparatus 104 is described in more detail below with reference to FIGS. 2 and 3.

In one embodiment, the structure apparatus 104 improves upon conventional methods of determining a microstructure of multiphase materials. Due to the complex interactions of wave propagation through multiphase materials, most conventional methods for analyzing the signals of acoustic, ultrasonic, or elastic waves propagating through multiphase materials use an effective medium approach, empirical method, or single-scatterer approximation, which are not only inaccurate, but also are usually limited to a few ultrasonic parameters that can only characterize the material at the macroscopic level, and cannot provide detailed information on the material's microstructure and micro-level properties. For example, effective medium approaches can provide information about the overall ultrasonic sound speed and attenuation properties of the material (e.g., the sound speed and attenuation of the examined human tissue), but very little about the microscopic heterogeneities in the material (e.g., cell-level changes in the tissue such as nuclear changes in cancer cells).

The structure apparatus 104, in one embodiment, improves upon conventional methods for determining a microstructure of multiphase materials by implementing a signal processing method that provides information on the microstructural detail of the material using quantitative analyses of sound waves in the frequency domain to quantify the scattering events occurring between the waves and the scattering sites in the microstructure. The scattering events may be quantified to determine the size of the scattering sites, the number density of the scattering sites, and/or one or more other microstructural details of the multiphase material.

In various embodiments, the structure apparatus 104 may be embodied as a hardware appliance that can be installed or deployed on an information handling device 102, on a server 108, or elsewhere on the data network 106. In certain embodiments, the structure apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the structure apparatus 104 may include a power interface, a wired and/or wireless network interface, a graphical interface that attaches to a display, and/or a semiconductor integrated circuit device as described below, configured to perform the functions described herein with regard to the structure apparatus 104.

The structure apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the structure apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the structure apparatus 104.

The semiconductor integrated circuit device or other hardware appliance of the structure apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the structure apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data such as sound wave data sensed by the sound wave sensors; programs, code, applications, functions, libraries, and/or the like for analyzing the microstructure of a multiphase material, and/or the like.

Figure 2:
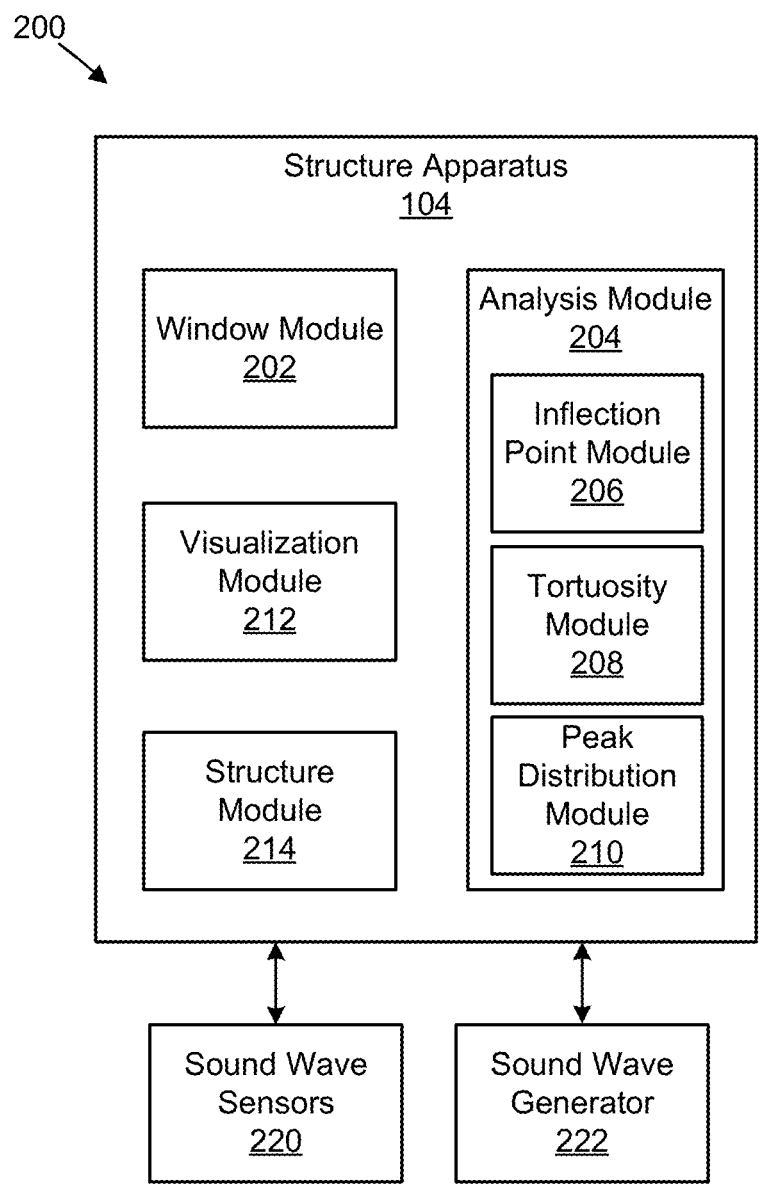
FIG. 2 is a schematic block diagram illustrating one embodiment of an apparatus for determining the microstructure and properties of materials using acoustic signal processing.

FIG. 2 is a schematic block diagram illustrating one embodiment of an apparatus 200 for determining the microscopic structure and properties of materials using acoustic signal processing. In one embodiment, the apparatus 200 includes one embodiment of a structure apparatus 104. The structure apparatus 104, in one embodiment, comprises a window module 202, an analysis module 204 that includes an inflection point module 206, a tortuosity module 208, and a peak distribution module 210, a structure module 212, and a visualization module 214. In one embodiment, the structure apparatus 104 is communicatively coupled to one or more sound wave sensors 220 and a sound wave generator 222.

In one embodiment, the window module 202 is configured to isolate a time-domain waveform of a sound-wave input generated based on sound-wave data sensed using the sensors 220. The window module 202, in certain embodiments, generates adaptive windows to exclude noise and artifacts on either side of a time range of a waveform that contains significant information (e.g., statistically significant information, information that can be used to generate meaningful results, etc.). Windows of both symmetric and asymmetric shapes, and with different slopes at the edges, may be used to remove or suppress noise outside the primary portion of the waveform as much as possible.

Since the windows are of an adaptive nature, their width and shape may depend on the input waveform. As used herein, the term "adaptive" implies that the window adapts to each input waveform to best maintain the unique time and amplitude characteristics of the waveform. In one embodiment, it is essential to differentiate between relevant information needed to be passed in the signal processing while rejecting the irrelevant information that is commonly known as noise. For each of these windows, the window module 202 may generate a window tailored to the size as the noisy input waveform.

Figure 3A:
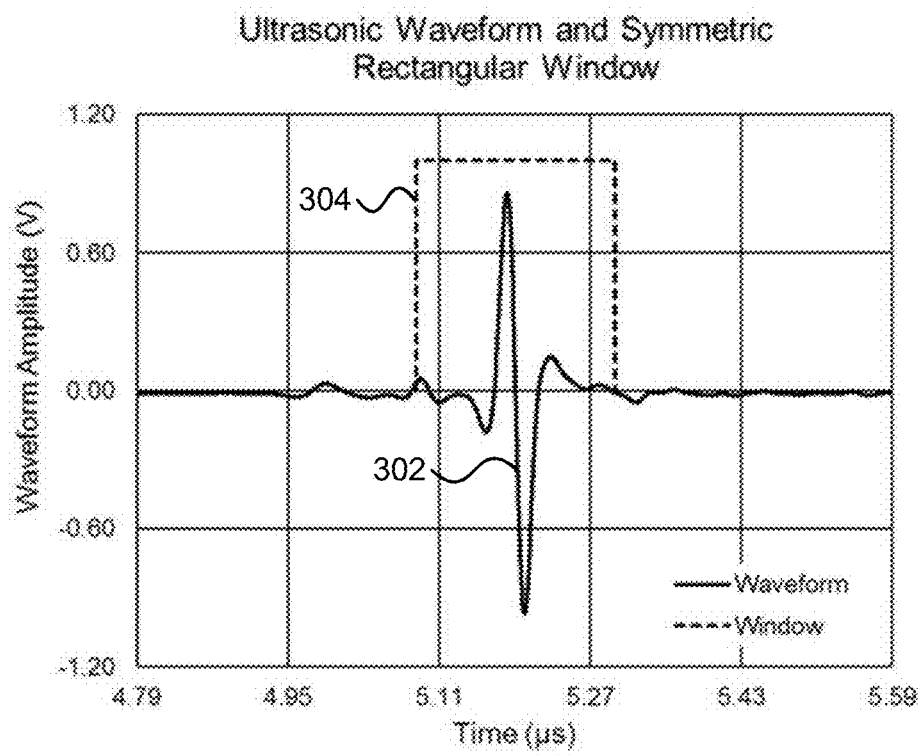
FIGS. 3A-3F illustrate generating a window to isolate a time-domain waveform of sound-wave input for determining the microstructure and properties of materials using acoustic signal processing.
Figure 3B:
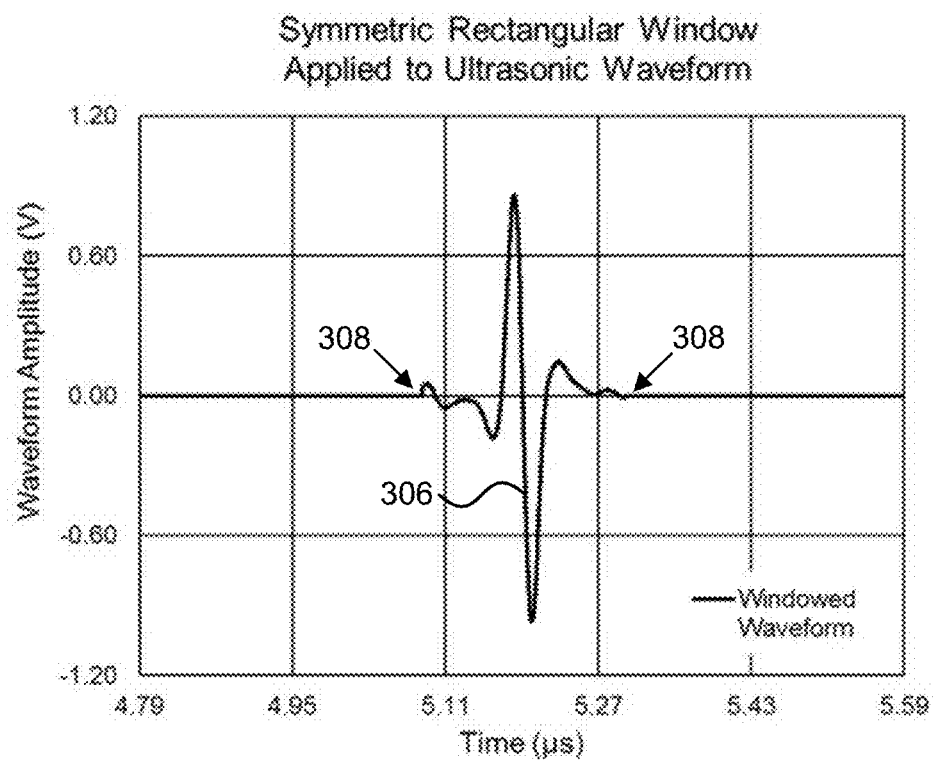

FIG. 3A depicts a through-transmission, unfiltered ultrasonic waveform 302, e.g., from multiphase material comprising the hind leg of a mouse superimposed with a symmetric, rectangular window 304. The principal portion of the ultrasonic waveform 302 lies between 5.11 and 5.27 µs, but significant noise resides outsides this time range as well. Windowing the waveform 302 with a symmetric, rectangular window 304, results in the filtered waveform 306 depicted in FIG. 3B. This may not be an ideal solution, however, because the steep edges of the window 304 create further artifacts in the waveform 306 at the waveform's edges 308. Also, setting a window 304 with a fixed time range may not be practical since, depending on the specimen tested, the waveform 302 may move in time by several microseconds (e.g., due to thickness and ultrasonic sound speed variations in the mouse tissue).

Figure 3C:
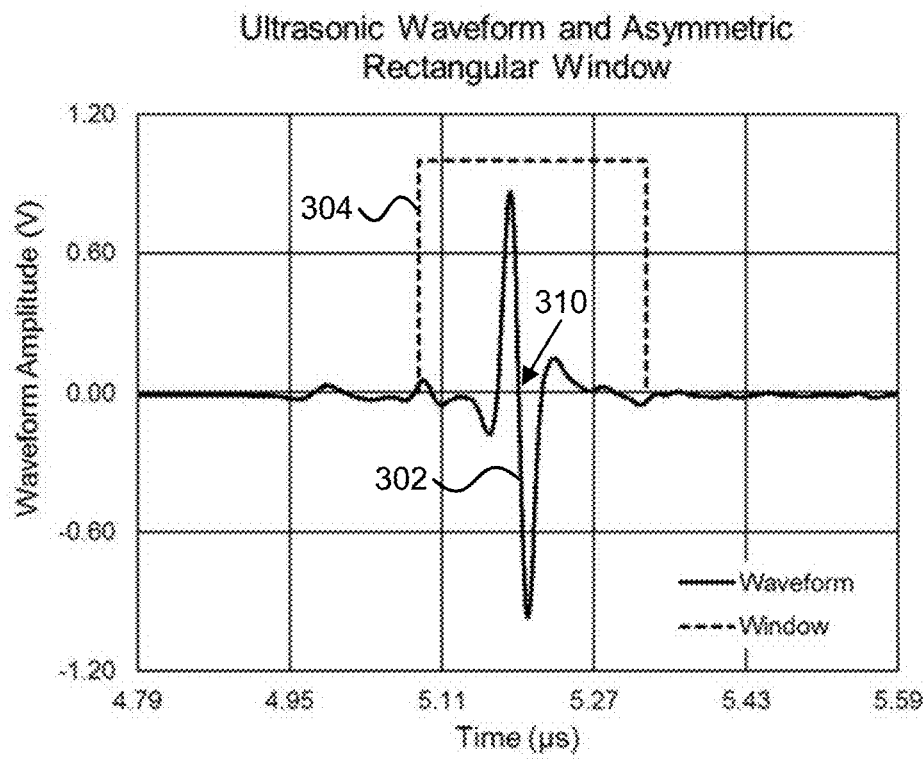
Figure 3D:
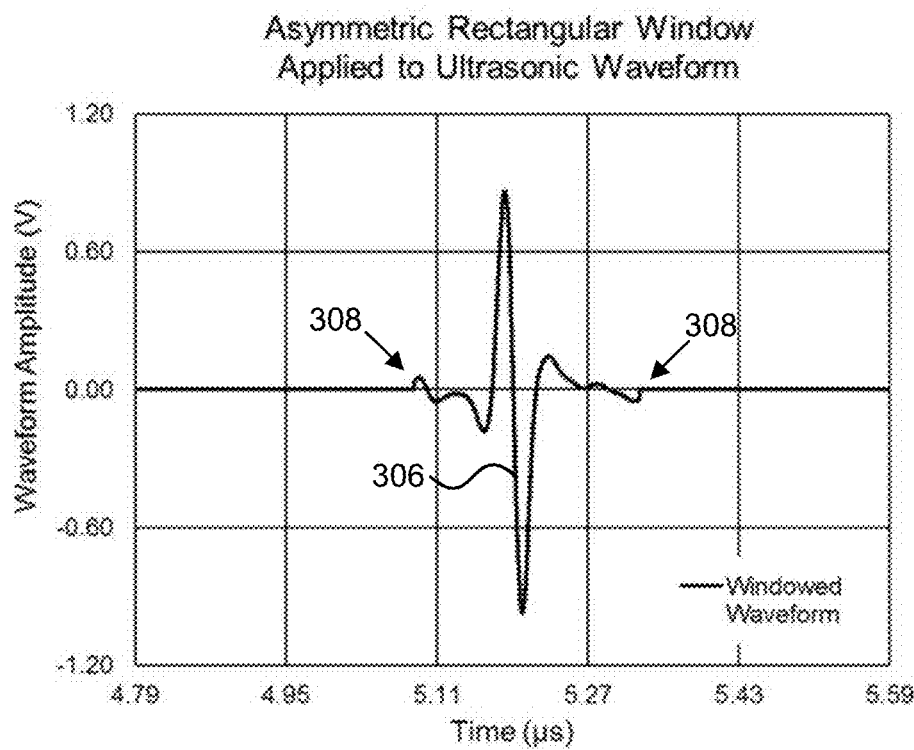

In one embodiment, the window module 202 solves the preceding problem by creating a window that is fit to the waveform 302, as depicted in FIG. 3C. In FIG. 3C, the edges of the rectangular window 304 are not symmetric about the waveform's center 310, but are defined by a predetermined threshold value. For instance, the position of the leading (left) edge of the window 304 is set (start point) when the amplitude of the waveform 302 satisfies a predetermined threshold fraction of the waveform's maximum amplitude when approaching the waveform 302 from the left side of the signal. Similarly, the trailing (right) edge of the window 304 is also set (end point) when the amplitude of the waveform 302 also reaches the threshold fraction of the waveform's maximum amplitude when approaching the waveform 302 from the right side of the signal. The resulting window 304 "follows" the time position and time-amplitude characteristics of the waveform 302. The window 304 is now insensitive to the time position of the waveform 302 in the signal, and thus to variations in specimen sound speed and thickness. Applying the window to the waveform 302, however, still produces artifacts at the waveform's edges 308 that may impede accurate signal processing, as depicted in FIG. 3D.

Figure 3E:
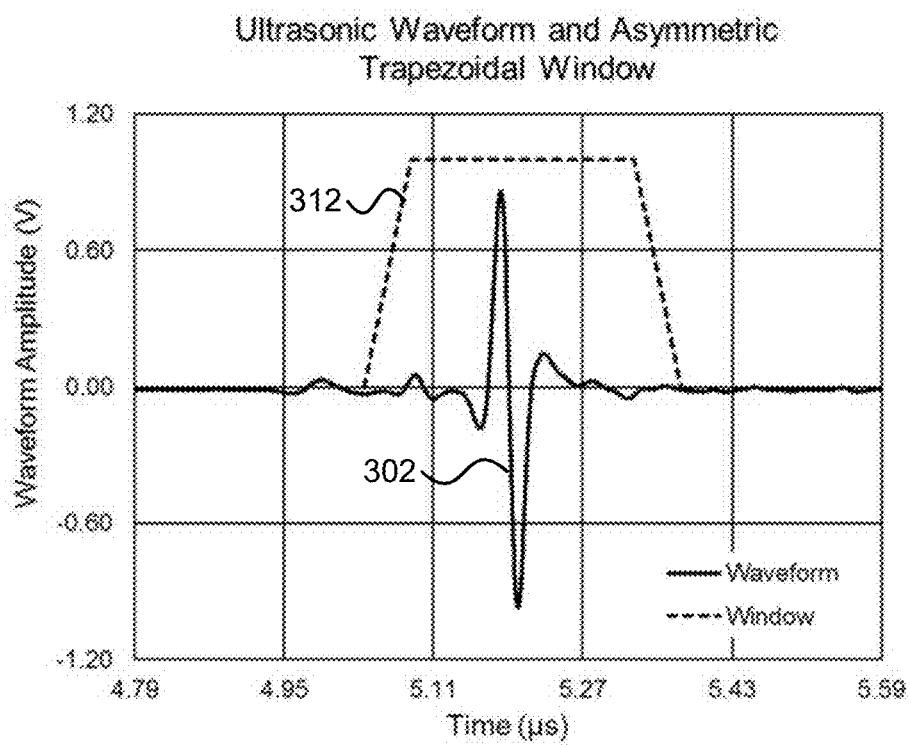
Figure 3F:
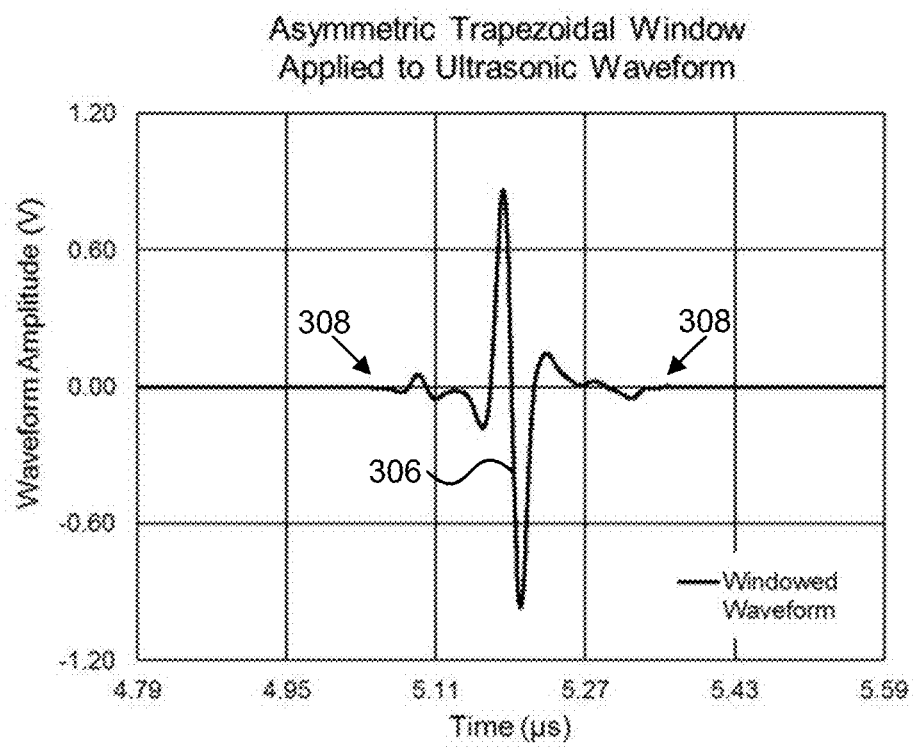

The artifacts created at the waveform's edges 308 by the rectangular window 304 may be due to its shape, specifically the discontinuous (vertical) edges of the window 304. To resolve this problem, the window module 202 may modify the window 312 by changing its shape to a trapezoid, as depicted in FIG. 3E. The less steep slopes of the window's edges reduce the production of artifacts in the filtering process, and produce a filtered waveform 306 with only the principal pulse remaining and no artifacts at the waveform's edges 308, as depicted in FIG. 3F.

Thus, the window module 202, in order to generate the isolated time-domain waveform 306, regardless of whether the window 304, 312 is rectangular, trapezoidal, or some other geometric shape, identifies a waveform amplitude start threshold for determining a start point of a window 304, 312 with respect to the waveform 302 and a waveform amplitude end threshold for an end point of the window 304, 312 with response to the waveform 302. The window module 202 may further determine the start point of the window 304, 312 as a function of the waveform amplitude start threshold, and determine the end point of the window 304, 312 as a function of the waveform amplitude end threshold. The window module 202 may determine a length of the window from the start point to the end point to isolate the waveform 302 in the time-domain and generate a filtered waveform 306.

Referring to FIG. 2, the analysis module 204, in one embodiment, is configured to perform one or more quantitative analyses on the received sound-wave input in the frequency domain. The analysis module 204, for instance, may take the windowed sound-wave input in the time-domain, as depicted in FIGS. 3A-3F, and convert it to the frequency domain using a fast Fourier transform ("FFT"), or the like, for further analysis in the frequency domain. The scattering events in the frequency domain may be quantified to determine the size of the scattering sites, the number density of the scattering sites, and/or one or more other microstructural details of the multiphase material. The analysis module 204 may calculate parameters that are used in either a univariate or multivariate analysis to fully and multi-dimensionally characterize the microstructure and properties of the multiphase material.

One example of a univariate analysis may be to determine and compare the inflection point densities from a training set of specimens of known microstructures (e.g., biological tissue of known pathology), correlate the inflection point densities to specific classes of microstructures (e.g., pathologies), and then use the correlated inflection point density value to determine the microstructures of unknown specimens (e.g., to diagnose the pathology of tissue specimens during surgery). For example, ultrasonic signals from malignant breast pathologies display high inflection point densities, whereas ultrasonic signals from atypical and normal pathologies display moderate and low inflection point densities, respectively. With a training set of specimens (tissue specimens of known pathology), inflection point density values can be established as classification boundaries for characterizing breast tissue. Such a univariate analysis can also be performed independently with tortuosity.

One example of a multivariate analysis would be to determine two parameters from a set of specimens and plot the specimen data points on a two-dimensional graph, where the x and y coordinates of the data points correspond to the values of the two parameters determined. For example, inflection point density and tortuosity values may be obtained from ultrasonic signals from breast lymph nodes. Upon plotting the inflection point density and tortuosity values for all of the data points (lymph nodes) on a two-dimensional graph, the malignant lymph nodes are classified by their clustering pattern in the plot. Multivariate analysis with inflection point density and/or tortuosity can also be performed with other acoustic parameters such as sound wave speed and/or attenuation, and can also be performed with three parameters using three-dimensional plotting techniques.

In one embodiment, the one or more quantitative analyses comprises an inflection point density analysis for analyzing a shape of a frequency-domain spectrum that the sound-wave input generates. In certain embodiments, the analysis module 204 includes an instance of an inflection point module 206 for performing the inflection point density analysis on the frequency domain waveform or spectrum.

As used herein, inflection point density analysis analyzes the shape of a frequency-domain waveform or spectrum from acoustic waves, ultrasonic waves, elastic waves, and/or the like. The inflection point module 206, in one embodiment, computes the number of inflection points in the amplitude-frequency curve, waveform, or spectrum of the signal within a specified frequency band. As used herein, an inflection point is a point on a curve at which the sign of the curvature (i.e., the concavity) changes. In further embodiments, the inflection point module 206 computes the distribution of inflection points for the waveform or spectrum with respect to frequency and across the specified frequency band.

The inflection point module 206, in various embodiments, computes the second derivative of the spectrum with respect to frequency. The inflection point module 206 may count, accumulate, total, or otherwise determine the number of times the second derivative crosses zero on the y-axis for a specific x-axis range, e.g., spectral band or frequency range. This provides the number of inflection points in the signal within a spectral band, denoted as the inflection point density. The inflection point module 206 may determine the frequency distribution of the inflection points by assigning each inflection point a corresponding frequency position. The inflection point module 206 may correlate the inflection point density and inflection point distribution to an empirical, theoretical, or computational database to characterize the medium.

Figure 4A:
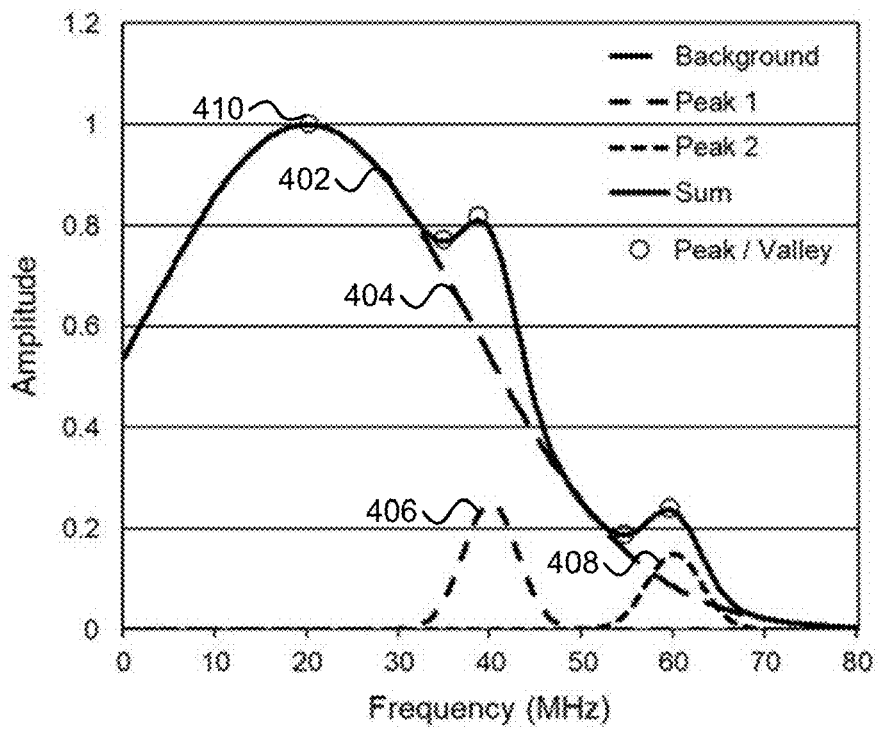
FIGS. 4A-4B illustrate using an inflection point density analysis for analyzing a shape of a frequency-domain spectrum of a sound-wave input for determining the microstructure and properties of materials using acoustic signal processing.
Figure 4B:
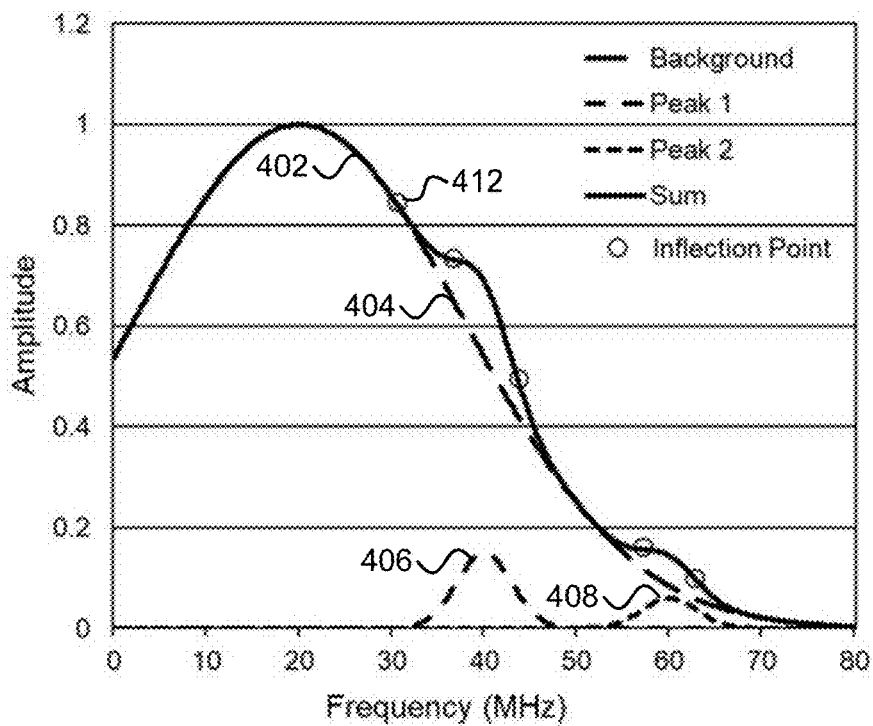

FIGS. 4A and 4B depict the concept of computing the inflection point density to quantify the number of scattering peaks and valleys. FIG. 4A shows an example of a power spectrum 402 for a high-frequency ultrasonic signal transmitted through a medium such as, for example, a surgically resected tissue specimen. As used herein, the power spectrum 402 describes the distribution of power into frequency components composing that signal. According to Fourier analysis any physical signal can be decomposed into a number of discrete frequencies, or a spectrum of frequencies over a continuous range. The statistical average of a certain signal or sort of signal (including noise) as analyzed in terms of its frequency content, is called its spectrum.

The power spectrum 402 includes components from the background 404 e.g., transducer spectrum modified by frequency dependent attenuation, and peaks 406, 408 resulting from Mie scattering in the medium, e.g., from cell nuclei. The sum of these components produces the power spectrum 402. One means of analyzing this spectrum 402 is to count the number of peaks and valleys 410 in a specified spectral band, for example, 20-80 MHz, yielding the parameter designated as peak density. The peak density parameter, for example, may correlate with tissue pathology in specimens from breast conservation surgery. In FIG. 4A, the peaks and valleys 410 are shown as open circles, and the peak density value would be five for the 20-80 MHz band.

A problem arises with the use of peak density analysis, however, when the scattered peaks and valleys, 406 and 408, have a low amplitude as compared to the background 404. As shown in FIG. 4B, the peaks and valleys, 406 and 408, become convoluted with the background 404 to such an extent that definite peaks and valleys, 406 and 408, cannot be accurately determined. In this case, finding the inflection points 412 of the total (summed) power spectrum 402 allows the number of peaks and valleys, 406 and 408, to be measured. As with peak density, the number of inflection points 412 within a specified spectral band (for example, 20-80 MHz), designated as inflection point density, can be used to differentiate tissue pathology, for example. In FIG. 4B, the inflection points 412 are shown as open circles. Note that the inflection point density in FIG. 4B is the same as the peak density in FIG. 4A, both having a value of 5 for the 20-80 MHz band.

Analysis using inflection point distribution may be an extension of both inflection point density analysis and peak distribution analysis. By analyzing the frequency positions of the inflection points 412, in addition to their total number in a specified frequency band, supplementary information can be obtained from the spectrum. For example, the frequency positions of the inflection points 412 in high-frequency ultrasonic power spectra can provide information on the size of scatterers in the medium. In human biological tissue and at frequencies of 20-80 MHz, the most effective scatterers for ultrasonic waves are cell nuclei. This has a decided advantage for diagnostic applications, for example, since larger cell nuclei, such as observed in malignant tissue, will result in spectral peaks 410 and inflection points 412 at lower frequencies than nonmalignant tissue with smaller cell nuclei.

Referring again to FIG. 2, in one embodiment, the one or more quantitative analyses comprises a tortuosity analysis for analyzing a shape of a frequency-domain spectrum that the sound-wave input generates. In certain embodiments, the analysis module 204 includes an instance of a tortuosity module 208 for performing the tortuosity analysis on the frequency domain waveform or spectrum.

Figure 5A:
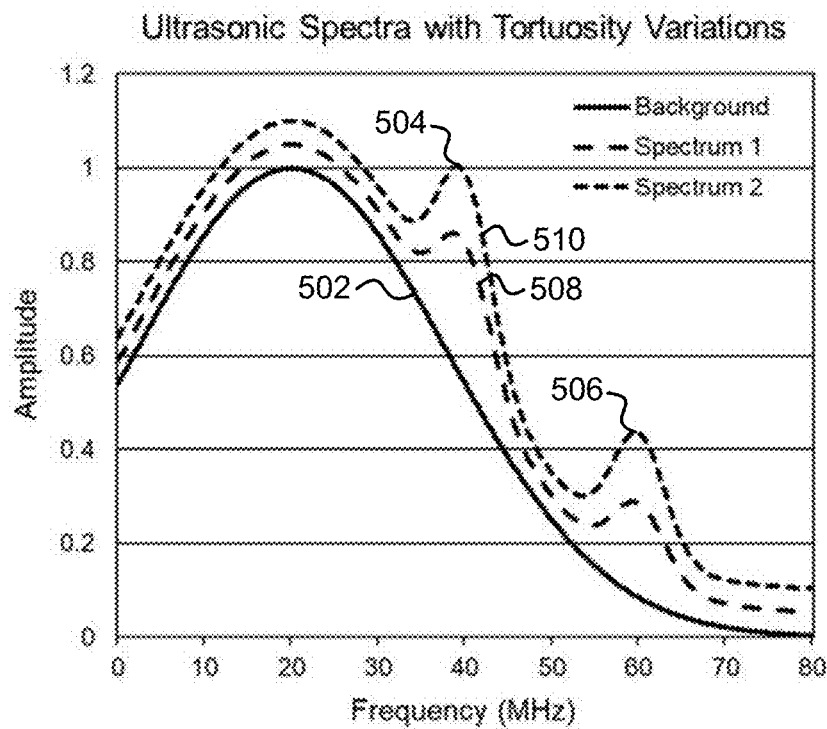
FIGS. 5A-5C illustrate using a tortuosity analysis for analyzing a shape of a frequency-domain spectrum of a sound-wave input for determining the microstructure and properties of materials using acoustic signal processing.
Figure 5B:
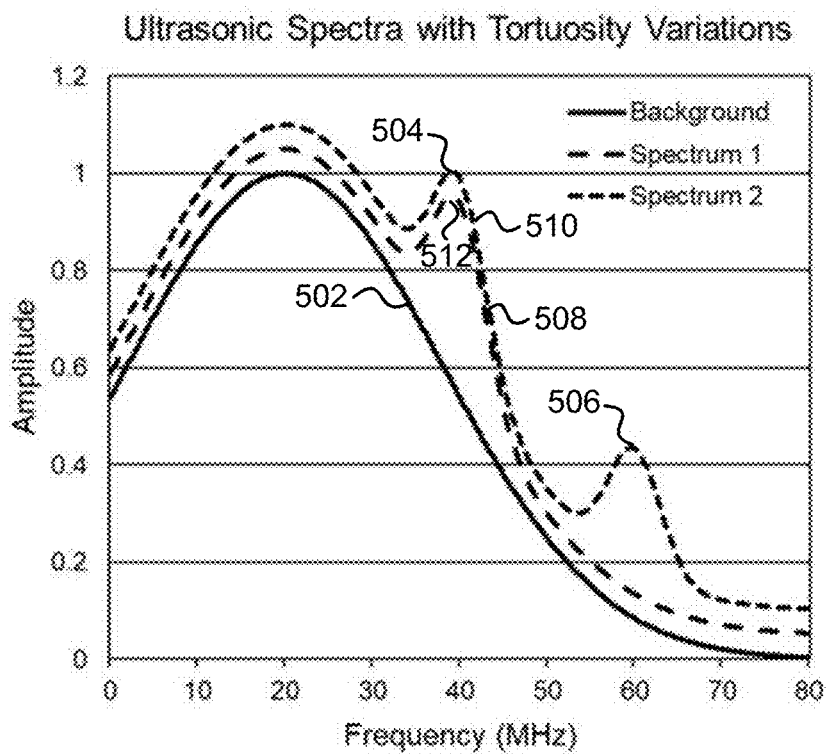

As used herein, tortuosity refers to the sinuosity or waviness of a curve or line, and can vary in spectra for many reasons, as shown in FIGS. 5A and 5B. FIGS. 5A and 5B display two examples of how tortuosity can vary in spectra, specifically high-frequency ultrasonic spectra in the 20-80 MHz range. The spectra are representative of power spectra for high-frequency ultrasonic signals transmitted through a medium such as a surgically resected tissue specimen. Note that in FIGS. 5A and 5B, the spectra have been offset by a constant factor for clarity.

In FIG. 5A, the spectra include components from the background 502 (transducer spectrum modified by frequency dependent attenuation) and two peaks 504, 506 resulting from Mie scattering in the medium (for example, from cell nuclei). The sum of these components produces the power spectra 508, 510 (Spectrum 1 and Spectrum 2). In FIG. 5A, changes in amplitude of the Mie-scattered peaks 504, 506 results in a change in the tortuosity of the spectra 508, 510 (Spectrum 1 versus Spectrum 2). In this example, tortuosity provides a quantitative measurement of scattering amplitude or intensity. Although these changes could be quantified by comparing the amplitudes of the peaks between the spectra, this approach often proves unreliable due to convolution (enveloping) of the peaks with the background spectrum (as depicted in FIG. 4B), variations in the background 502, instrumentation variability, the presence of numerous peaks, and the presence of other interfering factors.

FIG. 5B shows how tortuosity may change with the number of peaks and other features in a spectrum. Whereas Spectrum 1 508 only displays a single peak 512 due to Mie scattering, Spectrum 2 510 displays two peaks 504, 506. The additional peak 506 in Spectrum 2 510 increases its tortuosity with respect to Spectrum 1 508, thereby providing a quantitative measurement of the number of peaks in the spectrum. Although these changes could be quantified by directly counting the number of peaks in each spectrum, this approach often proves unreliable due to convolution (enveloping) of the peaks with the background spectrum or other peaks in the spectrum, as illustrated in FIG. 4B.

Figure 5C:
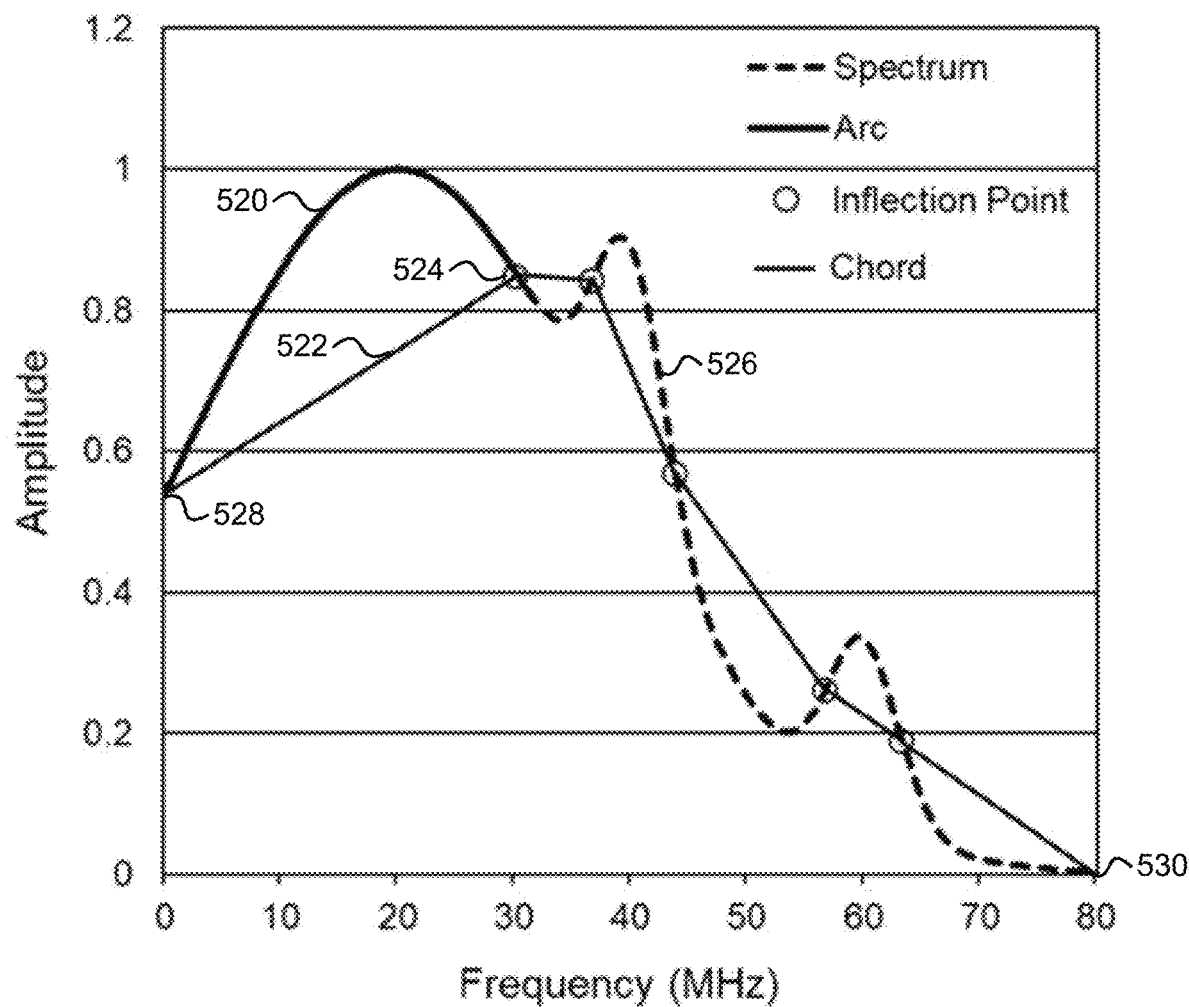

FIG. 5C illustrates how the tortuosity module 208 calculates the tortuosity for a spectrum 526 (in this example, a high-frequency ultrasonic spectrum). The tortuosity module 208, in one embodiment, determines inflection points 524 to delineate arc segments 520 in the spectrum 526 by computing the second derivative of the spectrum 526 with respect to frequency. The tortuosity module 208 may determine the x-axis values at which the second derivative crosses zero. This provides the positions of the inflection points 524 in the signal within a spectral band.

Next, the tortuosity module 208 linear calculates distances between adjacent inflection points 524 to obtain the chord lengths ($S_i$) 522 for each arc segment in the spectrum 526. Similarly, the tortuosity module 208 calculates the lengths of the arc segments ($L_i$) 520 between adjacent inflection points 524. The ends (high and low range values) 528, 530 of the spectrum 526 are assumed to be inflection points 524 as well for the calculations. Finally, the tortuosity module 208 calculates the tortuosity for the spectrum 526 in the specified spectral band using the following equation:

$$T = \frac{n-1}{L} * \sum_{i=1}^{n}\left(\frac{L_i}{S_i} - 1\right)$$

where n is the total number of segments (where a segment is defined as the region from one inflection point 524 to the next), L is the total length of the curve, i is the segment number, $L_i$ is the arc length of the curve in the given segment, and $S_i$ is the chord length 522, from each inflection point 524 to the next, of the given segment. The tortuosity module 208, in certain embodiments, correlates the tortuosity to an empirical, theoretical, or computational database to characterize the medium.

Tortuosity, in one embodiment, provides a unique approach for obtaining the scattering contribution to ultrasonic attenuation, and therefore a potential new window on multiphase material microstructures and micro-properties. Scattering is a primary contributor to ultrasonic attenuation and is strongly dependent on multiphase material microstructure and scale. Since tortuosity increases with increases in both the number and amplitude of scattering peaks in spectra, tortuosity may provide a robust and easy to use method for quantifying this scattering contribution. In addition, by normalizing the spectral background, attenuation due to internal (instrument) and external (viscoelastic absorption) sources may also be accounted for, permitting greatly simplified measurements without the need for additional parameters requiring determination such as sample thickness.

Referring again to FIG. 2, in one embodiment, the one or more quantitative analyses comprises a peak distribution analysis for determining a distribution of peaks and valleys for a frequency-domain spectrum that the sound-wave input generates. In certain embodiments, the analysis module 204 includes an instance of a peak distribution module 210 for performing the peak distribution analysis on the frequency domain waveform or spectrum.

As used herein, peak distribution refers to the distribution of peaks and/or valleys as a function of frequency in an acoustic, ultrasonic, or elastic wave spectrum. As with inflection point density and tortuosity, the peak distribution module 210 calculates peak distribution for a specified frequency range (spectral band). The peak distribution module 210, in one embodiment, analyzes the frequency distribution of spectral features (peaks and valleys, inflection points, etc.) that arise from scattering in the frequency-domain spectra of the acoustic, ultrasonic, or elastic waves to determine the size, composition, and/or other features of the scatterers dispersed in the medium.

The peak distribution module 210, in one embodiment, computes the frequency distribution of peaks (maxima), valleys (minima), inflection points (change in curvature), and/or other features in the amplitude-frequency curve (spectrum) of the signal within a specified frequency interval or band. The frequency distribution of the spectral features is then correlated to experimental data, computer simulation results, or theoretical calculations to determine the properties of the scattering structures. Correlation methods may include the use of scatter plots, heat maps, principal component analysis, and other data classification or machine learning approaches.

The peak distribution module 210, in certain embodiments, identifies features in an acoustic, ultrasonic, or elastic wave spectrum, and their corresponding frequency position in the spectrum, by one of several methods. For example, the peak distribution module 210 may identify peaks and valleys in the spectrum by computing the first derivative of the spectrum, and then finding the frequencies at which the first derivative crosses zero on the y-axis (indicating zero slope or minima/maxima in the spectrum).

Similarly, the peak distribution module 210 may determine inflection points and their corresponding frequencies by computing the second derivative of the spectrum with respect to frequency, and then finding the frequencies at which the second derivative crosses zero on the y-axis (indicating zero curvature or inflection points in the spectrum). Alternatively, for computing peak and valley positions, the peak distribution module 210 can examine each data point in the spectrum, for example through a computational loop, and compare the data point's amplitude with the amplitudes of the points immediately preceding and following the examined data point.

Referring back to FIG. 2, the visualization module 212 is configured to generate a visualization of the results of the one or more quantitative analyses. For example, FIG. 6 depicts results from application of the peak distribution analysis for the determination of pathology of surgically resected tissue specimens from breast conservation surgery (BCS) using high-frequency (20-80 MHz) ultrasonic measurements. FIG. 6 shows a scatter plot of peak and valley distributions as a function of frequency from specimens having different pathologies. In FIG. 6, the specimen pathologies have been grouped into four categories: benign pathology, atypical pathology, in situ carcinoma, and invasive carcinoma.

Figure 6A:
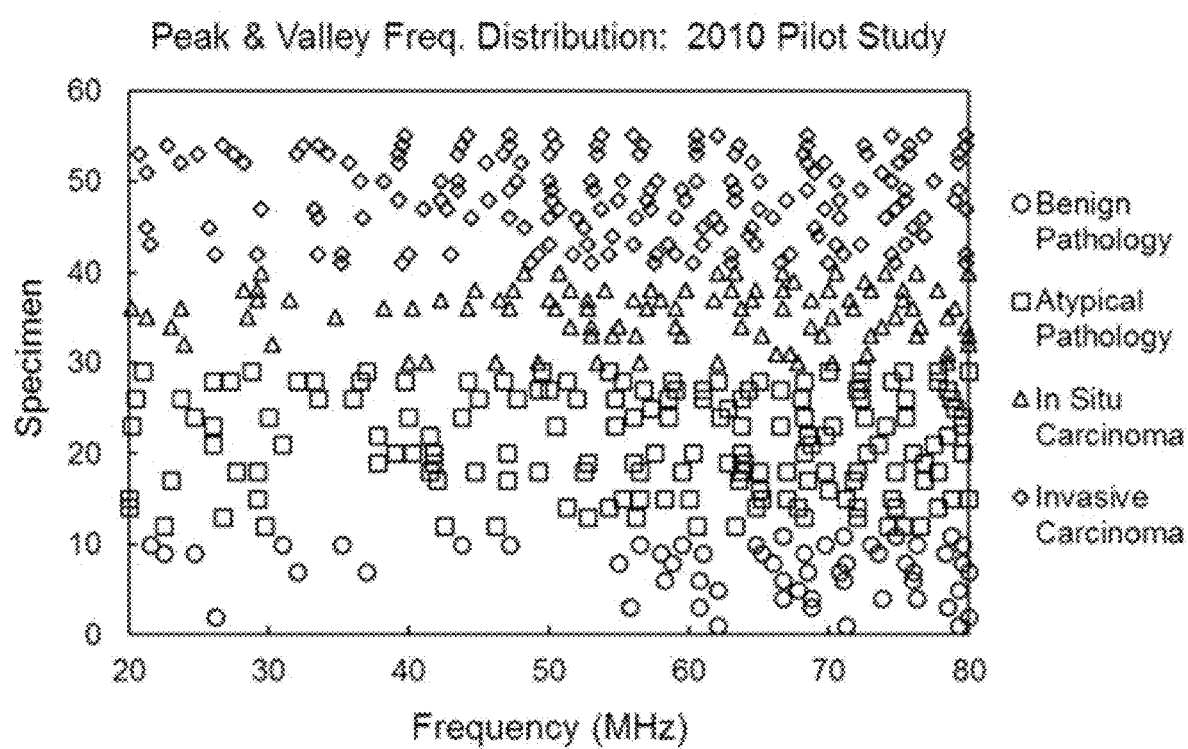
FIGS. 6A-6C illustrate using peak distribution analysis for determining a distribution of peaks and valleys of a frequency-domain spectrum of a sound-wave input for determining the microstructure and properties of materials using acoustic signal processing.

As shown in FIG. 6A, the frequency distributions for benign pathologies are primarily localized at high frequencies (60-80 MHz). The frequency distributions for the atypical pathologies, however, show (1) an overall increase in peaks and valleys, (2) a gradual spreading of the peaks and valleys from the high frequencies down to 50 MHz, and (3) more peaks and valleys in the 10-50 MHz range as compared to the benign pathologies. Finally, the malignant pathologies show (1) a significant overall increase in peaks and valleys, (2) a significant spreading of these features down to 40 MHz, and (3) more peaks and valleys in the 10-40 MHz range as compared to the benign pathologies. Benign pathologies include normal, lymph node, fibroadenoma, tubular adenoma, and fat necrosis tissue. Atypical pathologies include fibrocystic changes, benign calcifications, benign papilloma, and atypical ductal hyperplasia (ADH). In situ carcinomas included ductal carcinoma in situ (DCIS) and lobular carcinoma in situ (LCIS). Invasive carcinomas included invasive ductal carcinoma (IDC) and invasive lobular carcinoma (ILC).

Figure 6B:
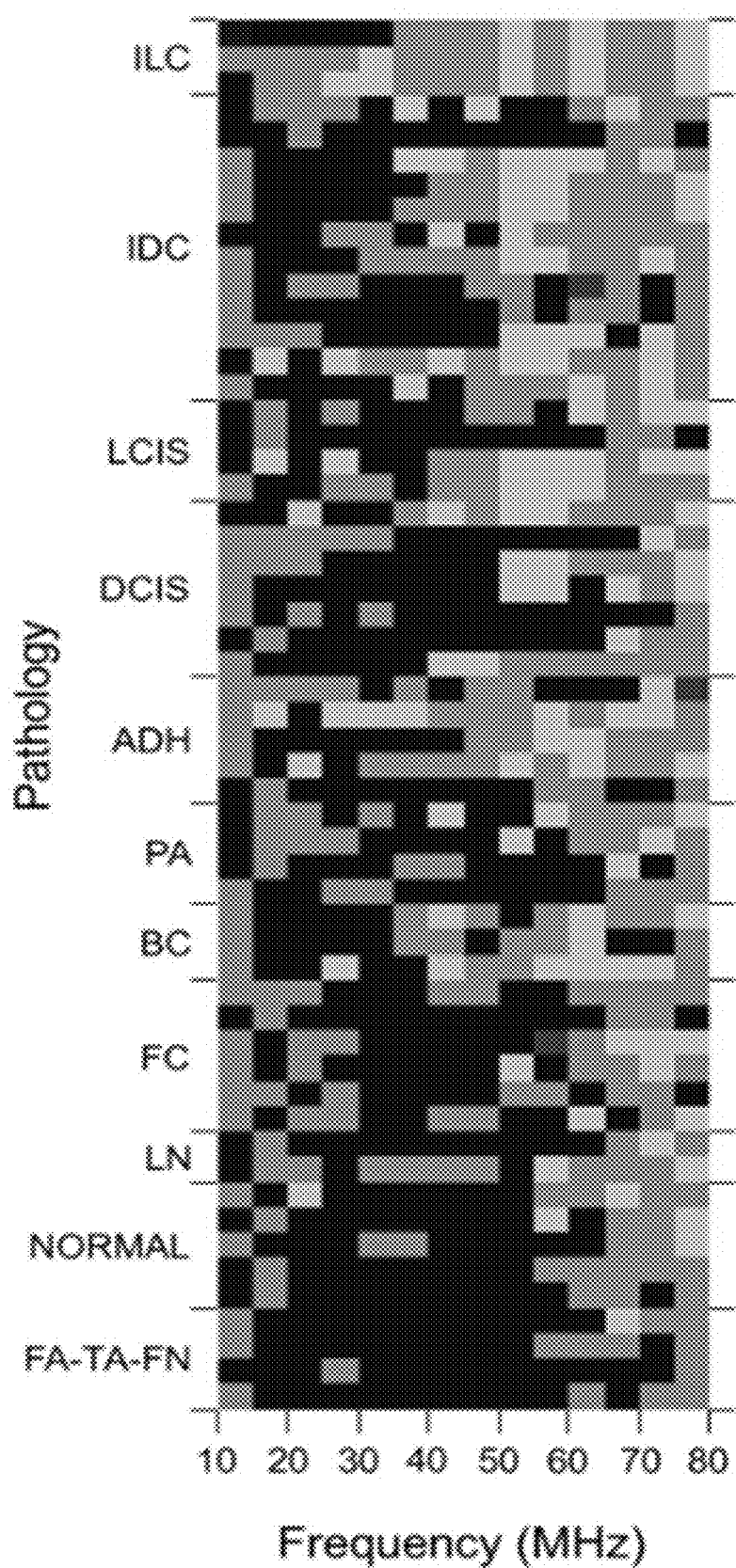

In further embodiments, the visualization module 212 generates heat maps, like the heat map illustrated in FIG. 6B, of the frequency distributions for the specimens and pathologies displayed in FIG. 6A. The visualization module 212 may generate a heat map by summing the number of peaks and valleys in 5-MHz intervals from 10-80 MHz (10-15 MHz, 15-20 MHz, 20-25 MHz, etc.) for each specimen's spectrum. The density (number) of peaks and valleys in each interval may then be displayed by color.

The heat map that the visualization module 212 constructs in the preceding manner, in one embodiment, illustrates the scattering features for the benign pathologies are localized in the 60-80 MHz range, and that these pathologies produce few scattering features in the 20-60 MHz range (large blue regions in the heat map). In contrast, the atypical pathologies show increases in peaks and valleys in both the 60-80 MHz and 20-60 MHz ranges. Finally, the in situ carcinomas and invasive carcinomas show significant increases in scattering features at all frequencies, but particularly concentrated in the 50-65 MHz range.

The heat map, therefore, shows trends that correlate the HF ultrasonic measurements with empirical data (conventional pathology laboratory results). Although the displayed data may be from a limited set of specimens, these trends can be further strengthened with the collection, analysis, and correlation of HF ultrasonic data from a larger set of specimens. The heat map also reveals, in certain embodiments, specimens that may produce false negative indications by a frequency distribution analysis of the HF ultrasound data, including 8 out of the 26 malignant specimens (31%). Again, further testing, analysis, and correlation of ultrasonic data from a larger study group of specimens may refine the application of the method for tissue characterization and cancer detection.

Figure 6C:
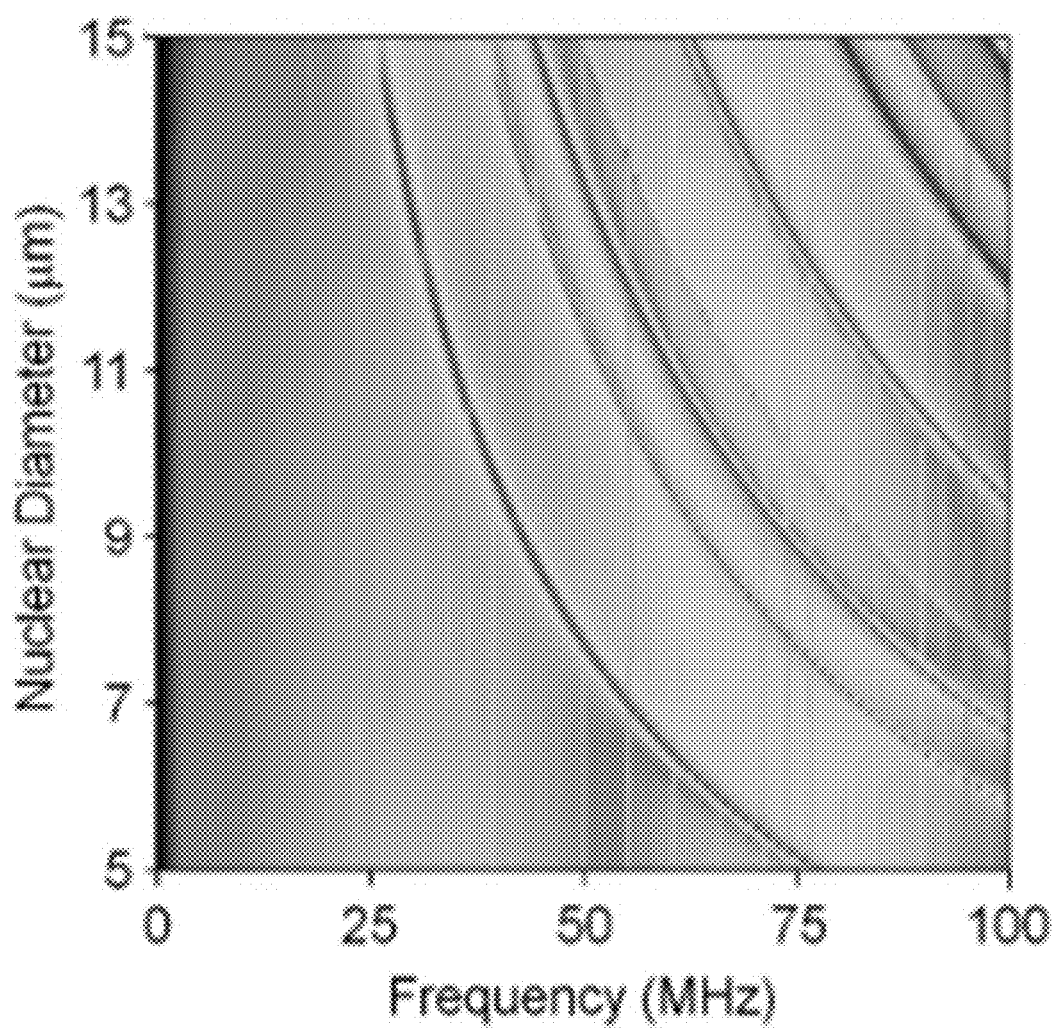

In some embodiments, the trends observed in peak distribution depicted in FIG. 6A closely match those from computer simulations of ultrasonic wave scattering from a single, nucleated biological cell, as illustrated in FIG. 6C. The previously executed computer simulation used a multipole expansion approach for the ultrasonic wave fields and a matrix solution of the boundary conditions at the cell and nuclear membranes to determine the scattered field amplitudes as a function of nuclear diameter and frequency. The computer model results in FIG. 6C clearly show that the number of spectral peaks for the 10-80 MHz band increases as the nuclear diameter increases. It also demonstrates that the distribution of peaks and valleys shifts to lower frequencies with increased nuclear diameter.

Due to the similarity between the trends in the peak distributions of BCS specimens tested with high-frequency ultrasound (FIG. 6A) and the simulation results, it can be concluded that the nuclear diameters of the cells in the BCS malignant tissue are larger than those in the BCS normal tissue. This conclusion is consistent with microscopic observations of breast cancer tissue sections. It also indicates that this particular type of ultrasonic testing may be specifically sensitive to nuclear diameter in tissue, an important parameter in histopathological analysis.

Such simulated data provides an example of how a peak distribution analysis can be correlated with computer model results to determine the properties of scattering structures in a medium. The visualization module 212 may achieve this by constructing a scatter plot (FIG. 6A), a heat map (FIG. 6B), a contour map (FIG. 6C), or similar plot of the computed peak density as a function of frequency and nuclear diameter. In example embodiment, a computer model greyscale map shows the same trends as the experimental data and computer model contour map, with increases in peak density at lower frequencies as nuclear diameter increases. Correlations of FIG. 6 with previously determined or simulated results may include the following observations:

a. Peak densities are only observed at high frequencies (60-80 MHz) for nuclear diameters of 5-6 µm, which correlate to benign tissue pathologies.
b. Peak densities appear and increase at lower frequencies (40-60 MHz) for nuclear diameters of 7-9 µm, which correlate to atypical tissue pathologies.
c. Peak density increases significantly in the 50-70 MHz region for nuclear diameters of 10-11 µm, which correlates to malignant (carcinoma) tissue pathologies.
d. The similarities between the trends in the high-frequency ultrasound peak distributions of breast cancer specimens and the computer model are consistent with the fact that the nuclear diameters of cells in malignant tissue are larger than those in normal tissue.

Computer models may also provide a fundamental understanding of what structures a particular acoustic, ultrasonic, or elastic wave measurement is sensitive to in a medium, and how the peak distribution arises from a particular scattering structure.

Peak distribution, in one embodiment, is an extension of peak density analysis and inflection point density analysis. By analyzing the frequency positions of the peaks, valleys, and/or inflection points, in addition to their total number in a specified time or frequency band, supplementary information can be obtained from the spectrum. As shown in the above example, the frequency positions of the scattering features in high-frequency ultrasonic power spectra can provide information on the size of scatterers in the medium. Larger cell nuclei, such as observed in malignant tissue, may result in spectral peaks, valleys, and inflection points at lower frequencies than normal tissue with smaller cell nuclei.

Referring again to FIG. 2, the structure module 214 determines a microstructure of the multiphase material based on the results from the foregoing quantitative analyses. As explained above, the structure module 214 may compare the results, or visualizations of the results, to previously determined, calculated, estimated, simulated, or the like results for a similar multiphase material.

The resulting microstructure and results may have various applications. In medical applications, for example, the structure apparatus 104 may help in determining pathology and detecting cancer in biological tissue with high-frequency ultrasound (10-100 MHz) by determining cell nuclear diameter; determining the viability of tissue in wounds, burns, necrotic regions, organ transplants, and tissue transplants; and revealing neural network architecture and other fine microstructural details in biological tissue. Industrial applications for the structure apparatus 104 include, but are not limited to, assessing defects and inclusions in engineering materials such as metals and composites using ultrasound for nondestructive evaluation (0.10-10 MHz); quality control of materials consisting of dispersions or suspensions, such as ceramic and other inorganic slurries, paint, milk and other food products, and nanoparticle dispersions using ultrasonic measurements; and monitoring the health and aging of solid rocket propellants in strategic missiles, tactical missiles, and space launch vehicles. Geophysical applications for the structure apparatus 104 include, but are not limited to, seismic exploration for oil, natural gas, gas hydrates, and mineral resources; seismic characterization of aquifers and reservoirs; and acoustic evaluation of marine sediments.

In one embodiment, the one or more sensors 220 may include sensors configured to detect, measure, receive, and/or the like sound wave information for a multiphase material. The sensors 220 may include iezoceramic transducers, for example comprising lead zirconate titanate (PZT) as the ceramic sensing element; piezoelectric polymer transducers, for example comprising polyvinylidene difluoride (PVDF) as the polymer sensing element; capacitive micromachined ultrasonic transducers; ultrasonic transducers based on micro-electro-mechanical systems (MEMS); optical sensors, which measure the sound wave vibrations on the surface of the material using interferometry based measurements; electromagnetic acoustic transducers (EMATs), which use an electromagnetic pulse to generate sound waves in conductive or ferromagnetic materials; and ground motion transducers (geophones) for sensing seismic waves in the earth. For example, in a medical application, the sensors may be coupled to a forceps device and may be configured to sense sound wave information that is generated in biological tissue, as described in U.S. patent application Ser. No. 16/057,720 entitled "APPARATUS, SYSTEM AND METHOD FOR DIAGNOSTIC IMAGING FORCEPS" and filed on Aug. 7, 2018, for Timothy E. Doyle, which is incorporated by reference herein in its entirety. The sound wave information may be generated by a sound wave generator 222 that is external to the multiphase material, or may be generated internal to the multiphase material, e.g., by an earthquake, a shockwave, and/or the like.

In one embodiment, the sound wave generator 222 is operably coupled to the one or more sensors 220 to generate sound waves and transmit the sound waves into the multiphase material via the sensors 220. In one embodiment, the sound wave generator produces a specific voltage variation that is converted by a sensor 220 into a sound wave that is transmitted into the multiphase material. The type of voltage variation determines the characteristics of the transmitted sound wave. For example, a voltage spike or half square-wave variation produces a sound wave of short pulse duration in the time domain and a broad spectrum in the frequency domain. In contrast, a sinusoidal voltage variation of long time duration produces an analogous sinusoidal sound wave of long time duration in the time domain, but a narrow spectrum in the frequency domain.

For determining the microstructure and properties of multiphase materials, a short pulse/broad spectrum sound wave is preferred. The broad spectral characteristics of the sound wave allows the material to be sensed across a wide range of frequencies, which captures the greatest amount of information on the scattering processes occurring at the microstructural level. An example of a sound wave generator that would be used to determine the microstructure of biological tissue or composite materials would be a high-frequency ultrasonic pulser, capable of producing a half square-wave voltage pulse of up to 100 V amplitude and pulse width of 5-50 ns. The narrow pulse widths result in sound wave signals in the 10-100 MHz and broad spectra with very large FWHM (full width at half maximum).

Figure 7:
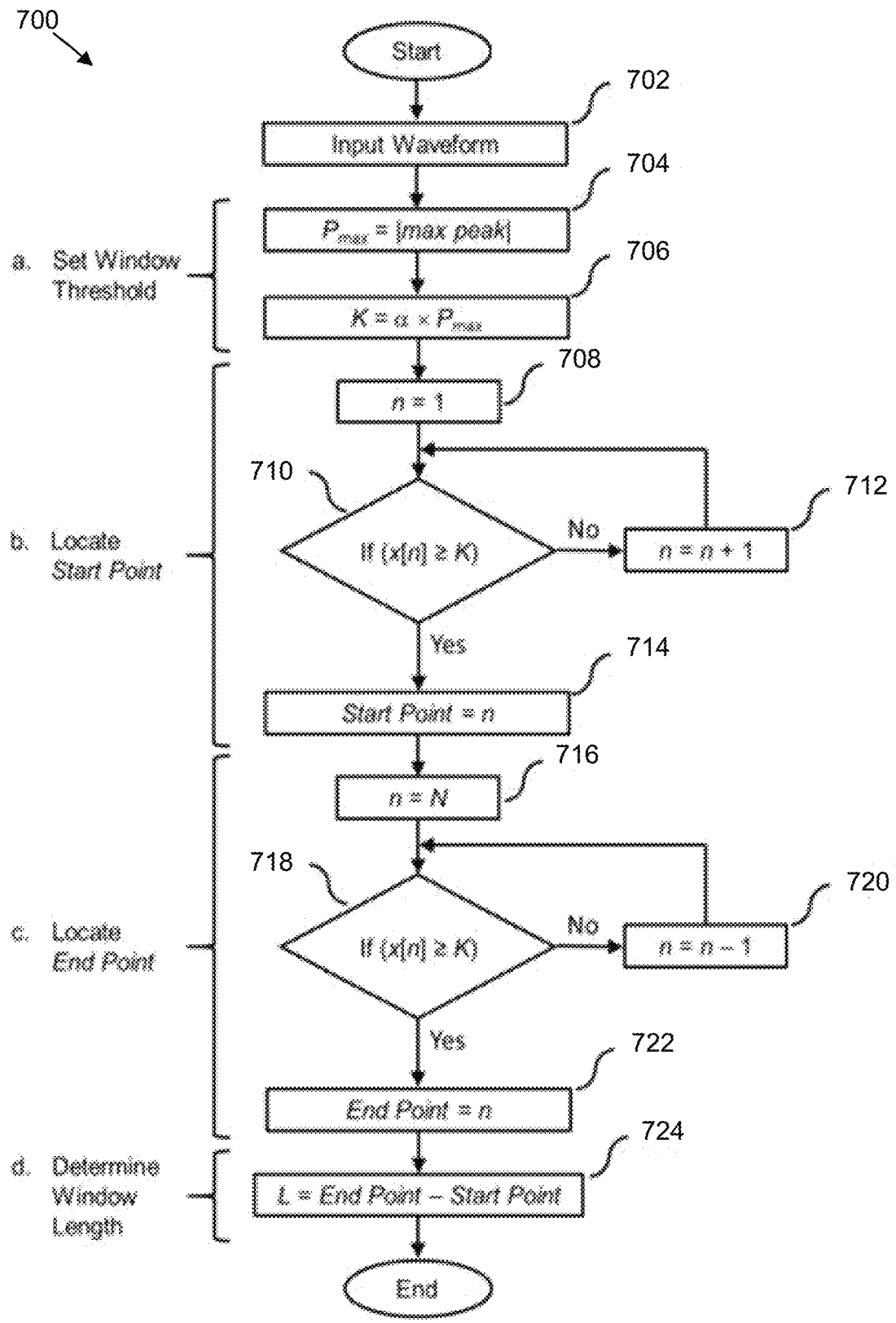
FIG. 7 is a schematic flow chart diagram illustrating one embodiment of a method for generating a window for determining the microstructure and properties of materials using acoustic signal processing.

FIG. 7 depicts a schematic flow-chart diagram of one embodiment of a method 700 for generating a window for windowing a waveform to isolate information and reject noise. In one embodiment, the method 700 begins and receives 702 an input waveform, such as a waveform for a captured sound wave and transformed into the frequency domain. The method 700, in certain embodiments, sets a window threshold by defining 704 a maximum peak amplitude, $P_{max}$, of the input waveform and determining 706 a waveform value K at which the start point and the end point of the window are defined by calculating $\alpha*P_{max}$ where $\alpha$ is a user-defined value between 0 and 1 and represents a percentage of $P_{max}$.

The method 700 locates the start point of the window by incrementally, starting with n=1 708, comparing 710 each waveform value x[n] at position n with the K value. If the method 700 determines 710 that the waveform value of x[n] is not greater than or equal to (e.g., is less than) the K value, then n is incremented 712 and the next waveform value x[n] is selected for comparison. Otherwise, the method 700 sets 714 the start point for the window to the n value at which x[n] is greater than or equal to K.

The method 700, in certain embodiments, locates the end point of the window by decrementally, starting with n=N 716 where N is the total number of possible waveform values, comparing 718 each waveform value x[n] at position n with the K value. If the method 700 determines 718 that the waveform value of x[n] is not greater than or equal to (e.g., is less than) the K value, then n is decremented 720 and the next waveform value x[n] is selected for comparison. Otherwise, the method 700 sets 722 the end point for the window to the n value at which x[n] is greater than or equal to K. In one embodiment, the method 700 determines the window length L by determining 724 the difference between the end point and the start point, and the method 700 ends.

Figure 8:
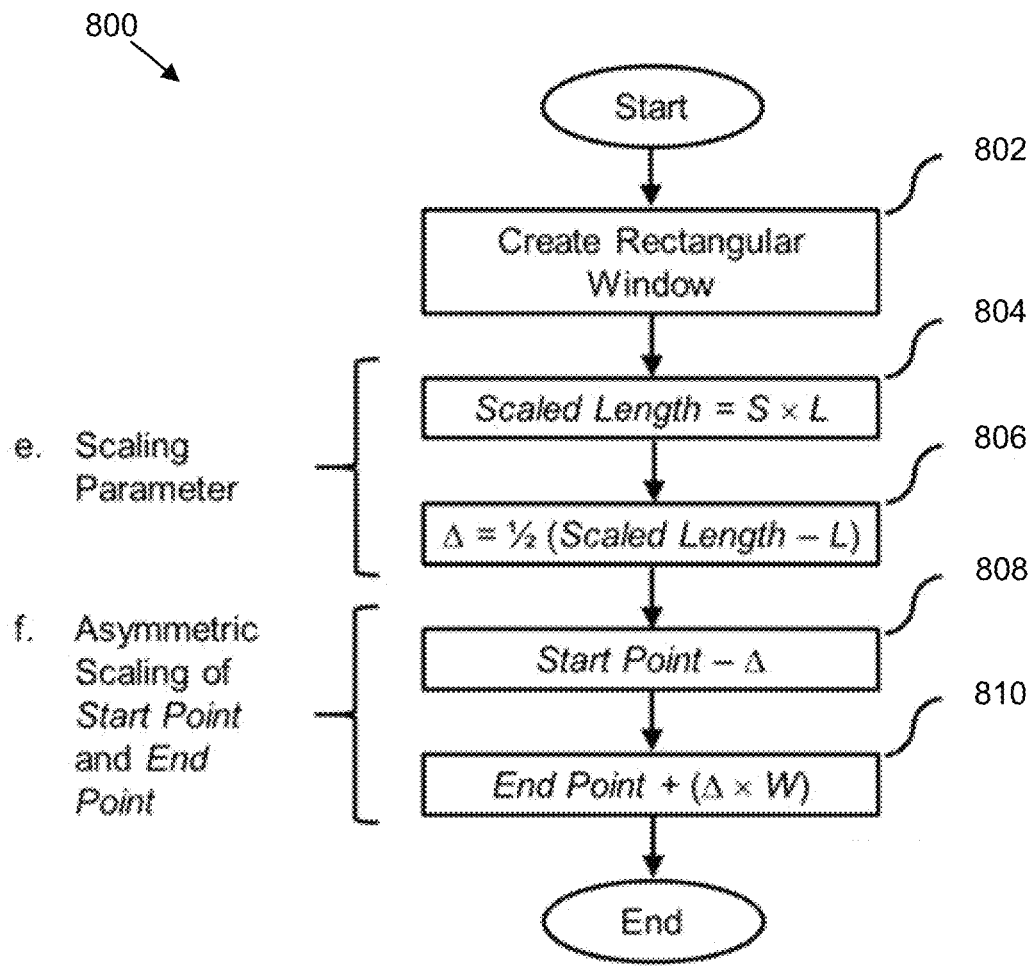
FIG. 8 is a schematic flow chart diagram illustrating one embodiment of another method for generating a window for determining the microstructure and properties of materials using acoustic signal processing.

FIG. 8 depicts a schematic flow-chart diagram of one embodiment of a method 800 for generating an asymmetric window for windowing a waveform to isolate information and reject noise. In one embodiment, the method 800 begins and creates 802 a window, in certain embodiments, based on the method 700 described above with reference to FIG. 7. In further embodiments, the method 800 determines a scaling parameter by calculating 804 a scaled length of the window—Scaled Length=S*L where S is a scaling factor and L is the window length.

The method 800, in certain embodiments, calculates 806 the scaling parameter, $\Delta=\frac{1}{2}$ (Scaled Length−L). The method 800, in some embodiments, determines the asymmetric scaling of the start point and the end point by (1) setting 808 the start point to the calculated value (start point−Δ) and (2) setting 810 the end point to the calculated value (end point+(Δ*W)) where W is a weight that determines the asymmetry degree for the end point. When W is equal to 1, a symmetric window is produced of different width based on the Δ parameter, and the method 800 ends.

Figure 9:
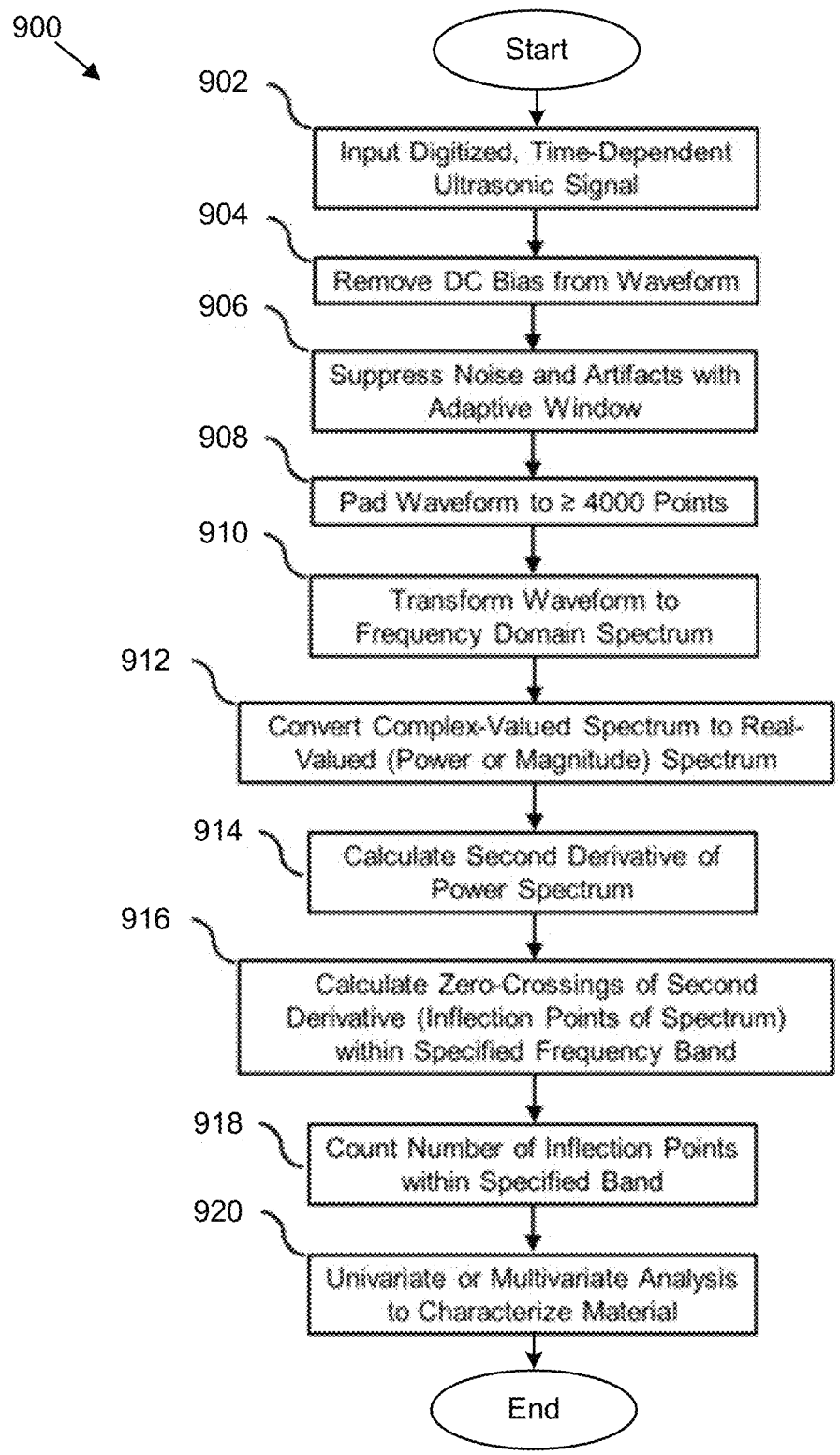
FIG. 9 is a schematic flow chart diagram illustrating one embodiment of a method for performing inflection point density analysis for determining the microstructure and properties of materials using acoustic signal processing.

FIG. 9 depicts a schematic flow-chart diagram of one embodiment of a method 900 for determining the inflection point density from a sound wave. In one embodiment, the method 900 begins and digitizes 902 time-dependent ultrasonic (or other sound wave) input that is received from one or more sound wave sensors to generate a waveform. The method 900, in certain embodiments, removes 904 direct current ("DC") bias from the waveform, which may be equivalent to performing high-pass filtering on the waveform. The method 900, in further embodiments, suppresses 906 noise and other artifacts from the waveform using an adaptive, dynamic, window as described above.

The method 900, in certain embodiments, pads 908 the waveform with zeroes, or some other value (which may increase the resolution of the subsequent spectrum) to some threshold number of points, e.g., 4000 points. In further embodiments, the method 900 transforms 910 the waveform to a frequency domain spectrum, e.g., using an FFT, or other transform, and converts 912 the transformed waveform to a power spectrum by taking the magnitude of each complex value of the spectrum's amplitude.

The method 900, in one embodiment, calculates 914 the second derivative of the power spectrum and calculates 916 the zero-crossings of the second derivative, e.g., the points in the spectrum that cross the y=0 line or x-axis (indicating points of zero curvature) to identify the inflection points in the spectrum. In various embodiments, the method 900 counts 918 the total number of inflection points within the specified band, frequency range, or window to determine the inflection point density. The method 900 may additionally perform 920 various univariate and/or multivariate analyses based on the inflection point density to characterize the multiphase material, and the method 900 ends.

Figure 10:
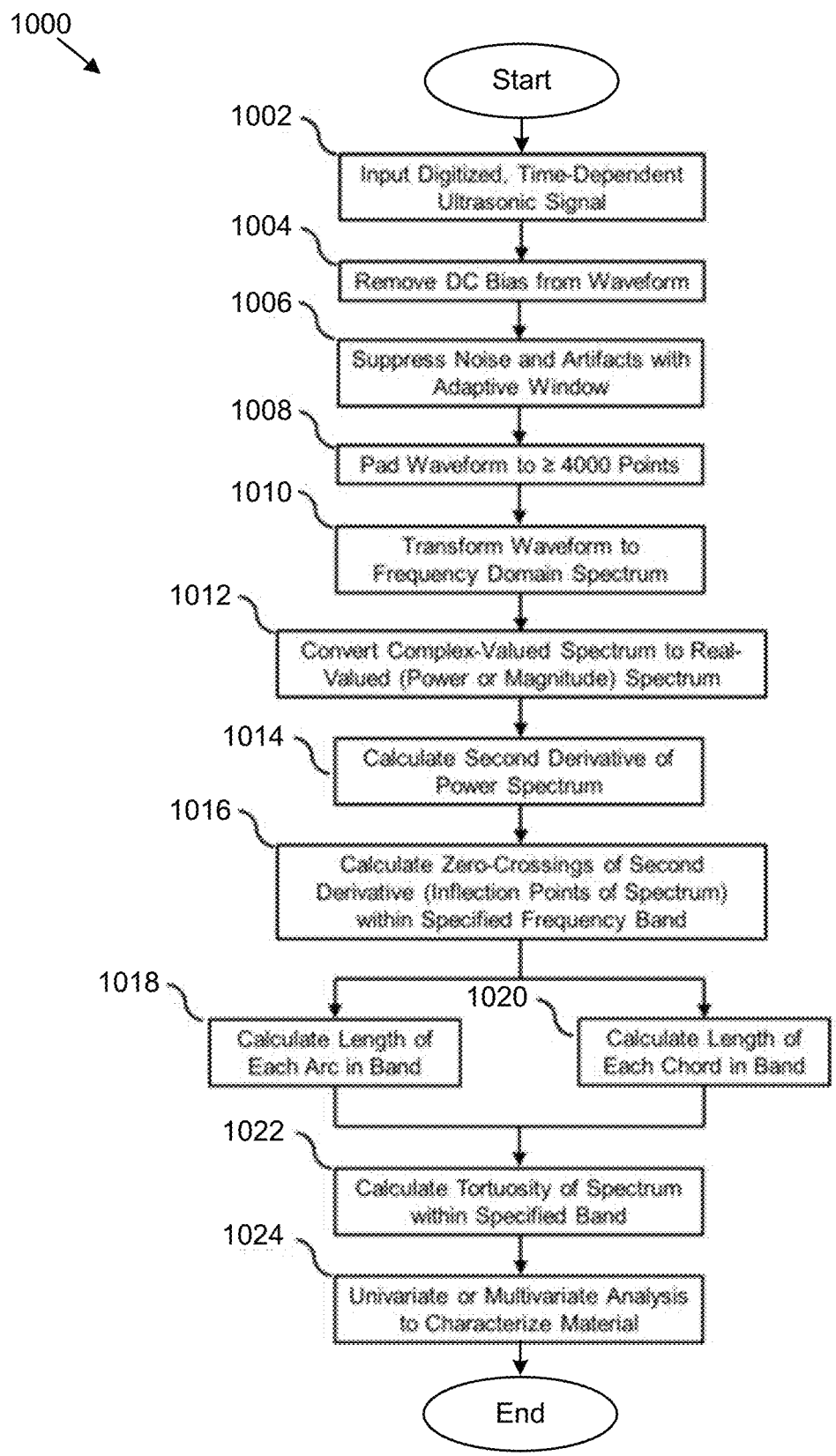
FIG. 10 is a schematic flow chart diagram illustrating one embodiment of a method for performing tortuosity analysis for determining the microstructure and properties of materials using acoustic signal processing.

FIG. 10 depicts a schematic flow-chart diagram of one embodiment of a method 1000 for determining the tortuosity of a sound wave. In one embodiment, the method 1000 begins and digitizes 1002 time-dependent ultrasonic (or other sound wave) input that is received from one or more sound wave sensors to generate a waveform. The method 1000, in certain embodiments, removes 1004 direct current ("DC") bias from the waveform, which may be equivalent to performing high-pass filtering on the waveform. The method 1000, in further embodiments, suppresses 1006 noise and other artifacts from the waveform using an adaptive, dynamic, window as described above.

The method 1000, in certain embodiments, pads 1008 the waveform with zeroes, or some other value (which may increase the resolution of the subsequent spectrum) to some threshold number of points, e.g., 4000 points. In further embodiments, the method 1000 transforms 1010 the waveform to a frequency domain spectrum, e.g., using an FFT, or other transform, and converts 1012 the transformed waveform to a power spectrum by taking the magnitude of each complex value of the spectrum's amplitude.

The method 1000, in one embodiment, calculates 1014 the second derivative of the power spectrum and calculates 1016 the zero-crossings of the second derivative, e.g., the points in the spectrum that cross the y=0 line or x-axis (indicating points of zero curvature) to identify the inflection points in the spectrum. In further embodiments, the method 1000 calculates 1018 the length of each arc (e.g., distance along spectrum curve between each neighboring inflection point) in the spectrum, and calculates 1020 the length of each chord (e.g., linear distance between each neighboring inflection point) in the spectrum.

In further embodiments, the method 1000 calculates 1022 the tortuosity of the waveform or spectrum within the windowed frequency range based on the arc lengths and the chord lengths. In certain embodiments, the method 1000 may additionally perform 1024 various univariate and/or multivariate analyses based on the inflection point density to characterize the multiphase material, and the method 1000 ends.

Figure 11:
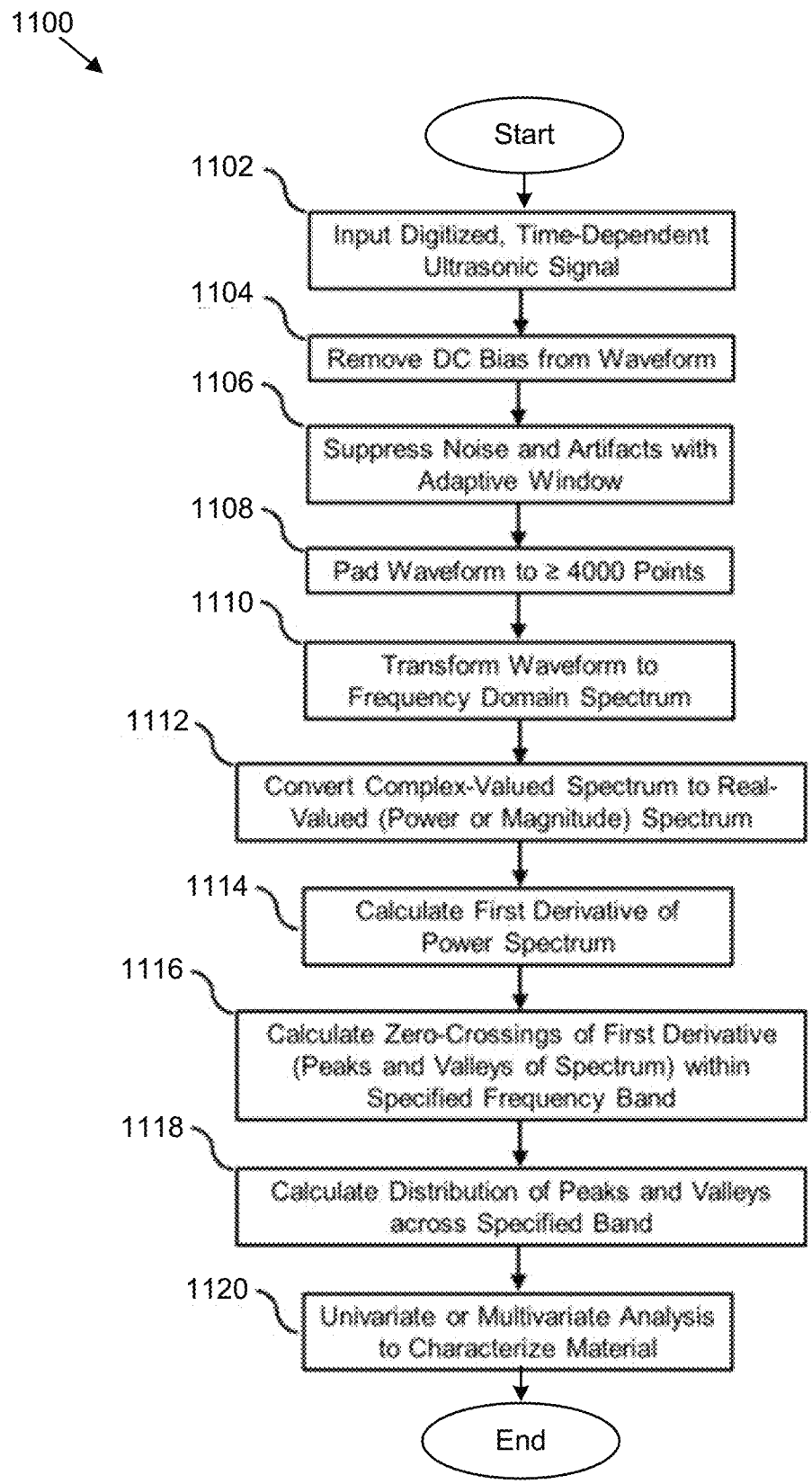
FIG. 11 is a schematic flow chart diagram illustrating one embodiment of a method for performing peak distribution analysis for determining the microstructure and properties of materials using acoustic signal processing.

FIG. 11 depicts a schematic flow-chart diagram of one embodiment of a method 1100 for determining the peak distribution of a sound wave. In one embodiment, the method 1100 begins and digitizes 1102 time-dependent ultrasonic (or other sound wave) input that is received from one or more sound wave sensors to generate a waveform. The method 1100, in certain embodiments, removes 1104 direct current ("DC") bias from the waveform, which may be equivalent to performing high-pass filtering on the waveform. The method 1100, in further embodiments, suppresses 1106 noise and other artifacts from the waveform using an adaptive, dynamic, window as described above.

The method 1100, in certain embodiments, pads 1108 the waveform with zeroes, or some other value (which may increase the resolution of the subsequent spectrum) to some threshold number of points, e.g., 4000 points. In further embodiments, the method 1100 transforms 1110 the waveform to a frequency domain spectrum, e.g., using an FFT, or other transform, and converts 1112 the transformed waveform to a power spectrum by taking the magnitude of each complex value of the spectrum's amplitude.

In one embodiment, the method 1100 calculates 1114 the first derivative of the spectrum, and the peaks and/or valleys in the spectrum are determined by calculating 1116 the zero-crossings of the first derivative, e.g., the points in the spectrum that cross the y=0 line or x-axis (indicating points of zero slope). The method 1100, in certain embodiments, calculates 1118 the total distribution of the peaks and valleys across the windowed frequency range, which is the peak distribution. In some embodiments, the method 1100 may additionally perform 1120 various univariate and/or multivariate analyses based on the inflection point density to characterize the multiphase material, and the method 1100 ends.

In certain embodiments, the peak distribution can be characterized by determining values including, but not limited to, the mean, median, mode, range, standard deviation, and shape parameters such as skewness and kurtosis. Furthermore, the peak distribution analysis can also be modified to provide the inflection point distribution, by calculating the second derivative of the spectrum instead of the first and tabulating the frequencies of the zero-crossings in a specified frequency range.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   one or more sensors for sensing information describing a multiphase material using sound waves;
   a processor operably coupled to the one or more sensors; and
   a memory that stores code executable by the processor to:
   receive sound-wave input from the one or more sensors;
   isolate a time-domain waveform of the sound-wave input by excluding noise data on either side of a time range of the waveform that contains statistically significant information;
   perform one or more quantitative analyses on the isolated time-domain waveform in the frequency domain; and
   determine a microstructure of the multiphase material based on results from the one or more quantitative analyses.

2. The apparatus of claim 1, wherein the one or more quantitative analyses comprises an inflection point density analysis for analyzing a shape of a frequency-domain spectrum that the sound-wave input generates.

3. The apparatus of claim 2, wherein the code is further executable by the processor to perform the inflection point density analysis by:
   performing a complex Fourier transform on the sound-wave input to generate a complex function;
   determining a magnitude of the complex function to obtain a power spectrum;
   calculating a second derivative of the power spectrum;
   identifying a frequency range of the power spectrum for determining the inflection point density;
   locating one or more inflection points of the power spectrum by determining where the second derivative goes to zero; and
   determining a total of the located one or more inflection points within the identified frequency range.

4. The apparatus of claim 1, wherein the one or more quantitative analyses comprises a tortuosity analysis for analyzing a shape of a frequency-domain spectrum that the sound-wave input generates.

5. The apparatus of claim 4, wherein the code is further executable by the processor to perform the tortuosity analysis by:
   performing a complex Fourier transform on the sound-wave input to generate a complex function;
   determining a magnitude of the complex function to obtain a power spectrum;
   calculating a second derivative of the power spectrum;
   identifying a frequency range of the power spectrum for determining the tortuosity;
   determining frequency positions of one or more inflection points of the power spectrum by calculating where the second derivative goes to zero;
   calculating a length of each arc between the one or more inflection points and along the power spectrum within the identified frequency range;
   calculating a length of each chord between the one or more inflection points within the identified frequency range; and
   calculating a tortuosity of the power spectrum within the identified frequency range based on the calculated lengths of each arch and the calculated lengths of each chord.

6. The apparatus of claim 1, wherein the one or more quantitative analyses comprises a peak distribution analysis for determining a distribution of peaks and valleys for a frequency-domain spectrum that the sound-wave input generates.

7. The apparatus of claim 6, wherein the code is further executable by the processor to perform the peak distribution analysis by:
   performing a complex Fourier transform on the sound-wave input to generate a complex function;
   determining a magnitude of the complex function to obtain a power spectrum;
   calculating a first derivative of the power spectrum;
   identifying a frequency range of the power spectrum for determining the peak distribution; and
   determining frequency positions of one or more peaks and valleys of the power spectrum by calculating where the first derivative goes to zero.

8. The apparatus of claim 1, wherein the code is further executable by the processor to determine the microstructure of the multiphase material by correlating the results from the one or more quantitative analyses to previously determined peak distribution results from computational scattering models.

9. The apparatus of claim 1, wherein the code is further executable by the processor to isolate a time-domain waveform of the sound-wave input by:
   identifying a waveform amplitude start threshold for determining a start point of a window with respect to the waveform and a waveform amplitude end threshold for an end point of the window with respect to the waveform;
   determining the start point of the window as a function of the waveform amplitude start threshold;
   determining the end point of the window as a function of the waveform amplitude end threshold; and
   determining a length of the window from the start point to the end point, the window isolating the waveform in the time-domain,
   wherein the one or more quantitative analyses are performed on the waveform isolated in the time-domain window.

10. The apparatus of claim 1, wherein the code is further executable by the processor to generate a visualization of the results of the one or more quantitative analyses, the visualization comprising one or more of a scatter plot and a heat map.

11. The apparatus of claim 1, wherein the multiphase material comprises at least one of biological tissues, engineering materials, and natural resources.

12. The apparatus of claim 1, further comprising a sound-wave generator operably coupled to the one or more sensors to transmit sound waves into the multiphase material.

13. A method comprising:
receiving, by a processor, sound-wave input from one or more sensors, the one or more sensors configured to sense information describing a multiphase material using sound waves;
isolating a time-domain waveform of the sound-wave input by excluding noise data on either side of a time range of the waveform that contains statistically significant information;
performing one or more quantitative analyses on the isolated time-domain waveform in the frequency domain; and
determining a microstructure of the multiphase material based on results from the one or more quantitative analyses.

14. The method of claim 13, wherein the one or more quantitative analyses comprises an inflection point density analysis for analyzing a shape of a frequency-domain spectrum that the sound-wave input generates.

15. The method of claim 14, further comprising performing the inflection point density analysis by:
performing a complex Fourier transform on the sound-wave input to generate a complex function;
determining a magnitude of the complex function to obtain a power spectrum;
calculating a second derivative of the power spectrum;
identifying a frequency range of the power spectrum for determining the inflection point density;
locating one or more inflection points of the power spectrum by determining where the second derivative goes to zero; and
determining a total of the located one or more inflection points within the identified frequency range.

16. The method of claim 13, wherein the one or more quantitative analyses comprises a tortuosity analysis for analyzing a shape of a frequency-domain spectrum that the sound-wave input generates.

17. The method of claim 16, further comprising performing the tortuosity analysis by:
performing a complex Fourier transform on the sound-wave input to generate a complex function;
determining a magnitude of the complex function to obtain a power spectrum;
calculating a second derivative of the power spectrum;
identifying a frequency range of the power spectrum for determining the tortuosity;
determining frequency positions of one or more inflection points of the power spectrum by calculating where the second derivative goes to zero;
calculating a length of each arc between the one or more inflection points and along the power spectrum within the identified frequency range; and
calculating a length of each chord between the one or more inflection points within the identified frequency range; and
calculating a tortuosity of the power spectrum within the identified frequency range based on the calculated lengths of each arch and the calculated lengths of each chord.

18. The method of claim 13, wherein the one or more quantitative analyses comprises a peak distribution analysis for determining a distribution of peaks and valleys for a frequency-domain spectrum that the sound-wave input generates.

19. The method of claim 18, further comprising performing the peak distribution analysis by:
performing a complex Fourier transform on the sound-wave input to generate a complex function;
determining a magnitude of the complex function to obtain a power spectrum;
calculating a first derivative of the power spectrum;
identifying a frequency range of the power spectrum for determining the peak distribution;
determining frequency positions of one or more peaks and valleys of the power spectrum by calculating where the first derivative goes to zero.

20. A program product comprising a computer readable storage medium having program code embodied therein, the program code readable/executable by a processor for:
receiving sound-wave input from one or more sensors, the one or more sensors configured to sense information describing a multiphase material using sound waves;
isolating a time-domain waveform of the sound-wave input by excluding noise data on either side of a time range of the waveform that contains statistically significant information;
performing one or more quantitative analyses on the isolated time-domain waveform in the frequency domain; and
determining a microstructure of the multiphase material based on results from the one or more quantitative analyses.

* * * * *